United States Patent
You

(10) Patent No.: US 10,601,656 B2
(45) Date of Patent: Mar. 24, 2020

(54) NETWORK ELEMENT UPGRADE METHOD AND DEVICE

(71) Applicant: Huawei Technologies Co., Ltd., Shenzhen (CN)

(72) Inventor: Guangrui You, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 174 days.

(21) Appl. No.: 15/909,587

(22) Filed: Mar. 1, 2018

(65) Prior Publication Data

US 2018/0191561 A1 Jul. 5, 2018

Related U.S. Application Data

(63) Continuation of application No. PCT/CN2016/094416, filed on Aug. 10, 2016.

(30) Foreign Application Priority Data

Sep. 2, 2015 (CN) .......................... 2015 1 0556227

(51) Int. Cl.
*G06F 15/177* (2006.01)
*H04L 12/24* (2006.01)
(Continued)

(52) U.S. Cl.
CPC ........ *H04L 41/082* (2013.01); *G06F 9/45558* (2013.01); *H04L 12/4683* (2013.01);
(Continued)

(58) Field of Classification Search
CPC ....... G06F 9/45558; G06F 2009/45562; G06F 2009/45595; H04L 41/00; H04L 41/082; H04L 41/5041; H04L 12/4683
(Continued)

(56) References Cited

U.S. PATENT DOCUMENTS 7,962,582 B2 * 6/2011 Potti ....................... G06F 8/656
709/220
8,929,856 B1 1/2015 Kamboh et al.
(Continued)

FOREIGN PATENT DOCUMENTS

| CN | 101146021 A | 3/2008 |
| CN | 101170452 A | 4/2008 |

(Continued)

*Primary Examiner* — Frantz B Jean
(74) *Attorney, Agent, or Firm* — Leydig, Voit & Mayer, Ltd.

(57) ABSTRACT

A network element upgrade method and a device are provided, which relate to the field of communications technologies, so as to resolve a problem that in an existing upgrade process, after a network element switches all services to a new version, an overall situation may be affected once a problem occurs during the upgrade to the new version. The network element upgrade method provided in the present invention includes: receiving a distribution policy; forwarding, to a first network element according to the distribution policy, some of a plurality of received service messages sent by an external network element, and forwarding remaining service messages to a second network element according to the distribution policy; forwarding, to the second network element according to the distribution policy, all of a plurality of subsequently received service messages sent by the external network element.

20 Claims, 4 Drawing Sheets

(51) Int. Cl.
*G06F 9/455* (2018.01)
*H04L 12/46* (2006.01)

(52) U.S. Cl.
CPC .......... *H04L 41/00* (2013.01); *H04L 41/5041* (2013.01); *G06F 2009/45562* (2013.01); *G06F 2009/45595* (2013.01)

(58) Field of Classification Search
USPC ........................................................ 709/221
See application file for complete search history.

(56) References Cited

U.S. PATENT DOCUMENTS

| | | | |
|---|---|---|---|
| 2010/0309812 A1* | 12/2010 | Galan Marquez | ........................ H04L 41/0806 370/254 |
| 2012/0047244 A1 | 2/2012 | Shi et al. | |
| 2014/0115578 A1 | 4/2014 | Cooper et al. | |
| 2015/0355934 A1 | 12/2015 | Yin et al. | |
| 2016/0337244 A1* | 11/2016 | Baveja | ................ H04L 67/1002 |

FOREIGN PATENT DOCUMENTS

| | | | |
|---|---|---|---|
| CN | 101222424 A | | 7/2008 |
| CN | 101801029 A | | 8/2010 |
| CN | 103889002 | * | 6/2014 |
| CN | 103889002 A | | 6/2014 |
| CN | 103997414 A | | 8/2014 |
| CN | 104320812 A | | 1/2015 |
| CN | 105099789 A | | 11/2015 |
| EP | 2557823 A1 | | 2/2013 |

* cited by examiner

NETWORK ELEMENT UPGRADE METHOD AND DEVICE

CROSS-REFERENCE TO RELATED APPLICATIONS

This application is a continuation of International Application No. PCT/CN2016/094416, filed on Aug. 10, 2016, which claims priority to Chinese Patent Application No. 201510556227.9, filed on Sep. 2, 2015. The disclosures of the aforementioned applications are hereby incorporated by reference in their entireties.

TECHNICAL FIELD

The embodiments of the present invention relate to the field of communications technologies, and in particular, to a network element upgrade method and a device.

BACKGROUND

As a control core of an entire communications network, a core network needs to connect to various peripheral networks and devices. All network services need to be controlled and processed or forwarded by a core network element, and a network service provided by the core network element is irreplaceable. Therefore, when the core network element needs to be upgraded, a system that is processing a network service needs to be upgraded while normal processing of the network service needs to be ensured. That is, hitless upgrade of the core network needs to be implemented, and the service is not interrupted during upgrade of the system or only a brief interruption (for example, within 10 s) is allowed.

In the conventional art, hitless upgrade is usually performed on a core network element by using the following method: Processes in the network element are classified into a process on an active plane and a process on a standby plane; during upgrade, the standby plane is first upgraded to a new version (no service is processed on the standby plane); after the standby plane is upgraded, status switching is performed on the standby plane and the original active plane, and all services are switched from the original active plane to the original standby plane (a new active plane); then, the original active plane is upgraded. In the upgrade process, a very short service interruption (theoretically, a service interruption time is approximately 10 s) is generated only when the services are switched from the active plane to the standby plane that is upgraded to the new version, so as to implement hitless upgrade.

However, in a process of implementing the embodiments of the present invention, it is found that the foregoing hitless upgrade method has the following problems: Device configurations and networking of an existing network vary widely, an actual scenario in the existing network cannot be simulated at a research and development phase, and many problems of a network element of a new version can be found only during upgrade. Consequently, during the upgrade, after the network element switches all services to the new version, an overall situation may be affected once a problem occurs during the upgrade to the new version.

SUMMARY

To resolve the foregoing problem, the embodiments of present invention provide a network element upgrade method and a device, so as to resolve a problem that in an existing upgrade process, after a network element switches all services to a new version, an overall situation may be affected once a problem occurs during the upgrade to the new version.

The following technical solutions are used in embodiments of the present invention.

According to a first aspect, an embodiment of the present invention provides a network element upgrade method. The method includes:

receiving, by a software load balancer SLB, a distribution policy delivered by an element management system EMS;

forwarding, by the SLB to a first network element according to the distribution policy, some of a plurality of received service messages sent by an external network element, and forwarding remaining service messages to a second network element according to the distribution policy; and after a processing result of the service messages on the second network element meets a preset condition, forwarding, by the SLB to the second network element according to the distribution policy, all of a plurality of subsequently received service messages sent by the external network element, where the distribution policy is used to control a ratio of a quantity of the service messages forwarded to the first network element to a quantity of the service messages forwarded to the second network element, the second network element has a same configuration attribute and connection configuration as the first network element, the second network element and the first network element are located in different virtual local area networks, and a version of the second network element is not lower than a version of the first network element.

With reference to the first aspect, in a first possible implementation of the first aspect, the service message includes a user identifier of a user triggering the service message; and the forwarding, by the SLB to a first network element according to the distribution policy, some of a plurality of received service messages sent by an external network element, and forwarding remaining service messages to a second network element according to the distribution policy includes:

determining, by the SLB, a message type of each of the plurality of received service messages; and if the SLB determines that the message type of the service message is a Session Initiation Protocol SIP message, forwarding the service message to the first network element or the second network element according to the user identifier included in the SIP message and a distribution identifier and a white list in the distribution policy, where the distribution identifier is used to indicate that all of the plurality of service messages received by the SLB are to be forwarded to the first network element, all of the plurality of service messages received by the SLB are to be forwarded to the second network element, or it is uncertain whether to forward the plurality of service messages received by the SLB to the first network element or the second network element, and the white list is used to store at least one user identifier; or if the SLB determines that the service message is an IP link message, forwarding the service message to the first network element or the second network element according to 5-tuple information included in the IP link message and a correspondence between a 5-tuple attribute of a logic link and a virtual local area network identifier VLAN ID that are in the distribution policy, where the 5-tuple information includes an IP address of the external network element, a port number of the external network element, an IP address of the first network element, a port number of the first network element, and a transport protocol type, and the 5-tuple attribute of the logic link includes a source IP address, a source port number, a destination IP address, a destination port number, and a transport protocol type.

With reference to the first possible implementation of the first aspect, in a second possible implementation of the first aspect, the forwarding, by the SLB, the service message to the first network element or the second network element according to the user identifier included in the SIP message and a distribution identifier and a white list in the distribution policy includes:

querying, by the SLB, the distribution identifier; and querying the white list if the distribution identifier indicates that it is uncertain whether to forward the plurality of service messages received by the SLB to the first network element or the second network element, and forwarding the service message to the second network element if the user identifier in the service message is included in the white list, or forwarding the service message to the first network element if the user identifier in the service message is not included in the white list;

forwarding the service message to the second network element if the distribution identifier indicates that all of the plurality of service messages received by the SLB are to be forwarded to the second network element; or forwarding the service message to the first network element if the distribution identifier indicates that all of the plurality of service messages received by the SLB are to be forwarded to the first network element.

With reference to the first possible implementation of the first aspect, in a third possible implementation of the first aspect, the forwarding, by the SLB, the service message to the first network element or the second network element according to 5-tuple information included in the IP link message and a correspondence between a 5-tuple attribute of a logic link and a virtual local area network identifier VLAN ID that are in the distribution policy includes:

determining, according to the correspondence between a 5-tuple attribute of a logic link and a virtual local area network identifier VLAN ID that are in the distribution policy, a first virtual local area network identifier VLAN ID corresponding to the service message, where the first VLAN ID is used to identify a first virtual local area network, and the first virtual local area network includes the first network element or the second network element; and forwarding, according to a correspondence between a network element and a virtual local area network identifier VLAN ID of a virtual local area network in which the network element is located, the service message to a network element corresponding to the first VLAN ID.

With reference to any one of the first to the third possible implementations of the first aspect, in a fourth possible implementation of the first aspect, before the receiving, by an SLB, a distribution policy delivered by an EMS, the method further includes:

sending, by the SLB, a synchronization request message to the first network element, where the synchronization request message is used to request to obtain interface information of the first network element, and the interface information of the first network element includes an IP address and a port number of a SIP server of the first network element and configuration information of a logic link for communication between the first network element and the external network element; and receiving and storing, by the SLB, the interface information of the first network element, and setting an external interface attribute of the SLB according to the received interface information of the first network element, where the interface attribute includes an IP address and a port number; and correspondingly, the determining, by the SLB, a message type of each of the plurality of received service messages includes:

determining the message type of the service message according to interface information included in the service message and the interface information of the first network element.

With reference to the first aspect, in a fifth possible implementation of the first aspect, the method further includes:

if the SLB receives a first service message sent by the first network element or the second network element, changing a source port number in the first service message, and recording, in a first relationship table, the changed source port number and a correspondence between the source port number and a virtual local area network identifier VLAN ID of a virtual local area network in which the network element sending the first service message is located;

forwarding the first service message including the changed source port number to the external network element;

receiving a response message returned by the external network element, where the response message includes a destination port number, and the destination port number is the changed source port number;

querying the first relationship table, to obtain a port number and a virtual local area network identifier VLAN ID that correspond to the destination port number; and sending the response message to a port of a network element in a virtual local area network identified by the virtual local area network identifier VLAN ID, where the first service message is a non-IP link message and includes a source IP address, a source port number, a destination IP address, and a destination port number.

With reference to any one of the first aspect or the first to the fifth possible implementations of the first aspect, in a sixth possible implementation of the first aspect, the preset condition is one or more of the following cases:

all service messages on the second network element are successfully processed; or a success rate of test cases of all service messages on the second network element is greater than or equal to a preset threshold.

According to a second aspect, an embodiment of the present invention provides a network element upgrade method, applied to an element management system EMS, and including:

creating, by the EMS, a second network element, where the second network element has a same configuration attribute and connection configuration as a first network element, the second network element and the first network element are located in different virtual local area networks, and a version of the second network element is not lower than a version of the first network element; and sending, by the EMS, a distribution policy to an SLB, so that the SLB forwards, to the first network element according to the distribution policy, some of a plurality of received service messages sent by an external network element, and forwards remaining service messages to the second network element according to the distribution policy; and after a processing result of the service messages on the second network element meets a preset condition, the SLB forwards, to the second network element according to the distribution policy, all of a plurality of subsequently received service messages sent by the external network element.

With reference to the second aspect, in a first possible implementation of the second aspect, the creating, by the EMS, a second network element includes:

instructing, by the EMS by using a virtualized network function manager VNFM, a virtualized infrastructure manager VIM in which the first network element is located to create a virtual machine image file of the first network element;

instructing, by the EMS, the VIM to create a virtual machine of the first network element; and embedding, by the EMS, the virtual machine image file of the first network element into the created virtual machine, to form the second network element.

With reference to the second aspect or the first possible implementation of the second aspect, in a second possible implementation of the second aspect, the method further includes:

reducing, by the EMS, a virtual machine resource of the first network element according to a quantity of reduced service messages that are processed on the first network element; and after the SLB forwards all of the plurality of subsequently received service messages to the second network element, deleting, by the EMS, the first network element to release virtual machine resources on the first network element.

With reference to any one of the second aspect or the first or the second possible implementation of the second aspect, in a third possible implementation of the second aspect, that a processing result of the service messages on the second network element meets a preset condition includes: all service messages on the second network element are successfully processed; or a success rate of test cases of all service messages on the second network element is greater than or equal to a preset threshold.

According to a third aspect, an embodiment of the present invention provides a software load balancer SLB, including:

a receiving unit, configured to receive a distribution policy delivered by an element management system EMS;

a distribution unit, configured to: forward, to a first network element according to the distribution policy, some of a plurality of received service messages sent by an external network element, and forward remaining service messages to a second network element according to the distribution policy received by the receiving unit; and after a processing result of the service messages on the second network element meets a preset condition, forward, to the second network element according to the distribution policy, all of a plurality of subsequently received service messages sent by the external network element, where the distribution policy is used to control a ratio of a quantity of the service messages forwarded to the first network element to a quantity of the service messages forwarded to the second network element, the second network element has a same configuration attribute and connection configuration as the first network element, the second network element and the first network element are located in different virtual local area networks, and a version of the second network element is not lower than a version of the first network element.

With reference to the third aspect, in a first possible implementation of the third aspect, the service message includes a user identifier of a user triggering the service message; and the distribution unit is configured to:

determine a message type of each of the plurality of received service messages; and if the message type of the service message is a Session Initiation Protocol SIP message, forward the service message to the first network element or the second network element according to the user identifier included in the SIP message and a distribution identifier and a white list in the distribution policy, where the distribution identifier is used to indicate that all of the plurality of service messages received by the SLB are to be forwarded to the first network element, all of the plurality of service messages received by the SLB are to be forwarded to the second network element, or it is uncertain whether to forward the plurality of service messages received by the SLB to the first network element or the second network element, and the white list is used to store at least one user identifier; or if the service message is an IP link message, forward the service message to the first network element or the second network element according to 5-tuple information included in the IP link message and a correspondence between a 5-tuple attribute of a logic link and a virtual local area network identifier VLAN ID that are in the distribution policy, where the 5-tuple information includes an IP address of the external network element, a port number of the external network element, an IP address of the first network element, a port number of the first network element, and a transport protocol type, and the 5-tuple attribute of the logic link includes a source IP address, a source port number, a destination IP address, a destination port number, and a transport protocol type.

With reference to the first possible implementation of the third aspect, in a second possible implementation of the third aspect, the distribution unit is configured to:

query the distribution identifier; and query the white list if the distribution identifier indicates that it is uncertain whether to forward the plurality of service messages received by the SLB to the first network element or the second network element, and forward the service message to the second network element if the user identifier in the service message is included in the white list, or forward the service message to the first network element if the user identifier in the service message is not included in the white list;

forward the service message to the second network element if the distribution identifier indicates that all of the plurality of service messages received by the SLB are to be forwarded to the second network element; or forward the service message to the first network element if the distribution identifier indicates that all of the plurality of service messages received by the SLB are to be forwarded to the first network element.

With reference to the first possible implementation of the third aspect, in a third possible implementation of the third aspect, the distribution unit is configured to:

determine, according to the correspondence between a 5-tuple attribute of a logic link and a virtual local area network identifier VLAN ID that are in the distribution policy, a first virtual local area network identifier VLAN ID corresponding to the service message, where the first VLAN ID is used to identify a first virtual local area network, and the first virtual local area network includes the first network element or the second network element; and forward, according to a correspondence between a network element and a virtual local area network identifier VLAN ID of a virtual local area network in which the network element is located, the service message to a network element corresponding to the first VLAN ID.

With reference to any one of the first to the third possible implementations of the third aspect, in a fourth possible implementation of the third aspect, the SLB further includes:

a sending unit, configured to: before the receiving unit receives the distribution policy delivered by the EMS, send a synchronization request message to the first network element, where the synchronization request message is used to request to obtain interface information of the first network element, and the interface information of the first network element includes an IP address and a port number of a SIP server of the first network element and configuration information of a logic link for communication between the first network element and the external network element;

the receiving unit is further configured to receive and store the interface information sent by the first network element; and the distribution unit is configured to: set an external interface attribute of the SLB according to the received interface information of the first network element, where the interface attribute includes an IP address and a port number; and determine the message type of the service message according to interface information included in the service message and the interface information of the first network element.

With reference to the third aspect, in a fifth possible implementation of the third aspect, the receiving unit is further configured to receive a first service message sent by the first network element or the second network element; and the distribution unit is further configured to: change a source port number in the first service message, and record, in a first relationship table, the changed source port number and a correspondence between the source port number and a virtual local area network identifier VLAN ID of a virtual local area network in which the network element sending the first service message is located;

forward the first service message including the changed source port number to the external network element;

the receiving unit is further configured to receive a response message returned by the external network element, where the response message includes a destination port number, and the destination port number is the changed source port number; and the distribution unit is further configured to query the first relationship table, to obtain a port number and a virtual local area network identifier VLAN ID that correspond to the destination port number; and send the response message to a port of a network element in a virtual local area network identified by the virtual local area network identifier VLAN ID, where the first service message is a non-IP link message and includes a source IP address, a source port number, a destination IP address, and a destination port number.

With reference to any one of the third aspect or the first to the fifth possible implementations of the third aspect, in a sixth possible implementation of the third aspect, the preset condition is one or more of the following cases:

all service messages on the second network element are successfully processed; or a success rate of test cases of all service messages on the second network element is greater than or equal to a preset threshold.

According to a fourth aspect, an embodiment of the present invention provides an element management system EMS, including:

a creation unit, configured to create a second network element, where the second network element has a same configuration attribute and connection configuration as a first network element, the second network element and the first network element are located in different virtual local area networks, and a version of the second network element is not lower than a version of the first network element; and a sending unit, configured to send a distribution policy to an SLB, so that the SLB forwards according to the distribution policy, to the first network element, some of a plurality of received service messages sent by an external network element, and forwards remaining service messages to the second network element according to the distribution policy; and after a processing result of the service messages on the second network element meets a preset condition, the SLB forwards, to the second network element according to the distribution policy, all of a plurality of subsequently received service messages sent by the external network element.

With reference to the fourth aspect, in a first possible implementation of the fourth aspect, the creation unit is configured to:

instruct, by using a virtualized network function manager VNFM, a virtualized infrastructure manager VIM in which the first network element is located to create a virtual machine image file of the first network element;

instruct the VIM to create a virtual machine of the first network element; and embed the virtual machine image file of the first network element into the created virtual machine, to form the second network element.

With reference to the fourth aspect or the first possible implementation of the fourth aspect, in a second possible implementation of the fourth aspect, the creation unit is further configured to:

reduce a virtual machine resource of the first network element according to a quantity of reduced service messages that are processed on the first network element; and after the SLB forwards all of the plurality of subsequently received service messages to the second network element, delete the first network element to release virtual machine resources on the first network element.

With reference to any one of the fourth aspect or the first or the second possible implementation of the fourth aspect, in a third possible implementation of the fourth aspect, that a processing result of the service messages on the second network element meets a preset condition includes: all service messages on the second network element are successfully processed; or a success rate of test cases of all service messages on the second network element is greater than or equal to a preset threshold.

It can be learned from the foregoing that the network element upgrade method provided in the embodiments of the present invention includes: receiving, by the SLB, the distribution policy delivered by the EMS; forwarding, to the first network element according to the distribution policy, the some of the plurality of received service messages sent by the external network element, and forwarding the remaining service messages to the second network element according to the distribution policy; and after the processing result of the service messages on the second network element meets the preset condition, forwarding, by the SLB to the second network element according to the distribution policy, all of the plurality of subsequently received service messages sent by the external network element. In this way, in a network element upgrade process, first, the SLB forwards some of service messages to the second network element for test running; then, after a running status on the second network element becomes normal, all of a plurality of subsequently received service messages are forwarded to the second network element. This reduces a risk that all services are damaged by switching all the services to a new network element in the network element upgrade process. In addition, an existing system architecture of a network element is not changed, only an SLB module is newly added outside the network element, and the internal structure of the network element is blocked. A network element instance is newly added inside the network element, and a message flow is controlled to be switched between new and old network elements, thereby preventing system reliability from decreasing during upgrade and meeting a telecommunication-level high reliability requirement.

BRIEF DESCRIPTION OF DRAWINGS

To describe the technical solutions in the embodiments of the present invention or in the prior art more clearly, the following briefly describes the accompanying drawings required for describing the embodiments or the conventional art. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

It should be noted that a network element upgrade method provided in the embodiments of the present invention not only may be applied to a network element upgrade scenario on a cloud computing platform or a non-cloud computing platform, but also may be applied to a network element cutover scenario and a disaster recovery switch scenario on the cloud computing platform or the non-cloud computing platform. This is not limited in the embodiments of the present invention. The present invention is described only by using the network element upgrade scenario on the cloud computing platform as an example. Implementation methods in the network element cutover scenario and the disaster recovery switch scenario are the same as the network element upgrade method described in the embodiments of the present invention, and details are not described herein.

Figure 1:
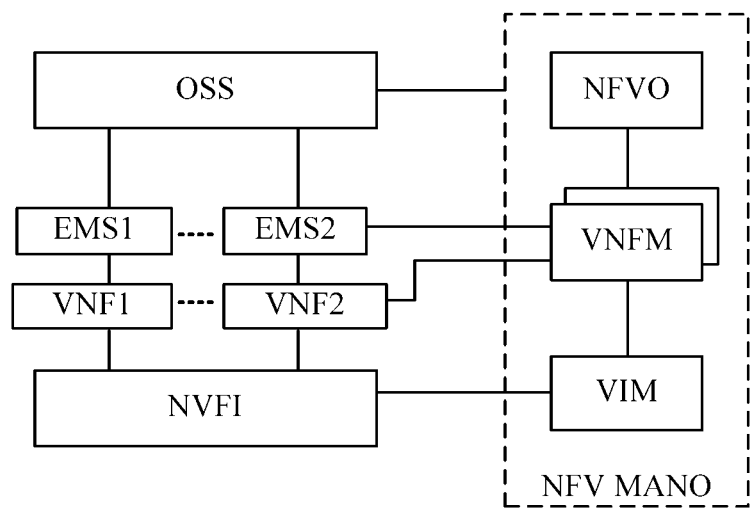
FIG. 1 is a schematic diagram of an existing NFV architecture.

On the cloud computing platform, a large quantity of telecommunications operators and manufacturers perform virtualization construction on a network element in a core network. A network system architecture shown in FIG. 1 and defined by a network function virtualization (NFV) standard is used as a cloud architecture of a telecommunications device. The NFV architecture may include an operations support system (OSS), at least one element management system (EMS), and the following several virtualized function nodes: a virtualized network function (VNF), network function virtualization infrastructure (NFV infrastructure, NFVI), and network function virtualization management and orchestration (NFV Management and Orchestration, NFV MANO). The OSS represents an operations support system of each operator, and is responsible for network management services such as an alarm, traffic statistics, configuration management, and network planning in different domains (such as a fixed network domain or a mobile network domain) of the operator, and coordinates and configures a common resource according to a service operation mode of a user and a billing rule when providing various convenient services to the user. The EMS needs to provide five basic functions, that is, fault, configuration, accounting, performance, security (FCAPS) in network management. In addition, usually, the EMS further has the following functions: topology management, system backup and recovery, system monitoring, log management, and serves as a northbound interface, and a command terminal. The VNF is a virtualized function device of a physical network element in the core network. The NFVI virtualizes a hardware resource into a virtual resource that can be dynamically requested to use, and provides the virtual resource to the VNF, so that the VNF has a same function as the physical network element. The VNF is operated and managed by the EMS. The NFV MANO plays an important role of performing overall control and coordination in the NFV architecture, and includes three parts: a network function virtualization orchestrator (NFV Orchestrator, NFVO), a virtualized network function manager (VNF Manager, VNFM), and a virtualized infrastructure manager (VIM). When there is a requirement for software and hardware resources, the NFV MANO coordinates, verifies, and grants requests for related resources, and is responsible for managing a life cycle of the VNF, for example, instantiating, elastically organizing, updating, querying, or terminating the VNF. In addition, the NFV MANO is also responsible for policy management of a network service, collection and forwarding of an associated event, and infrastructure-related resource configuration, for example, adding a resource to a virtual machine, improving energy efficiency, and returning a resource.

Figure 2:
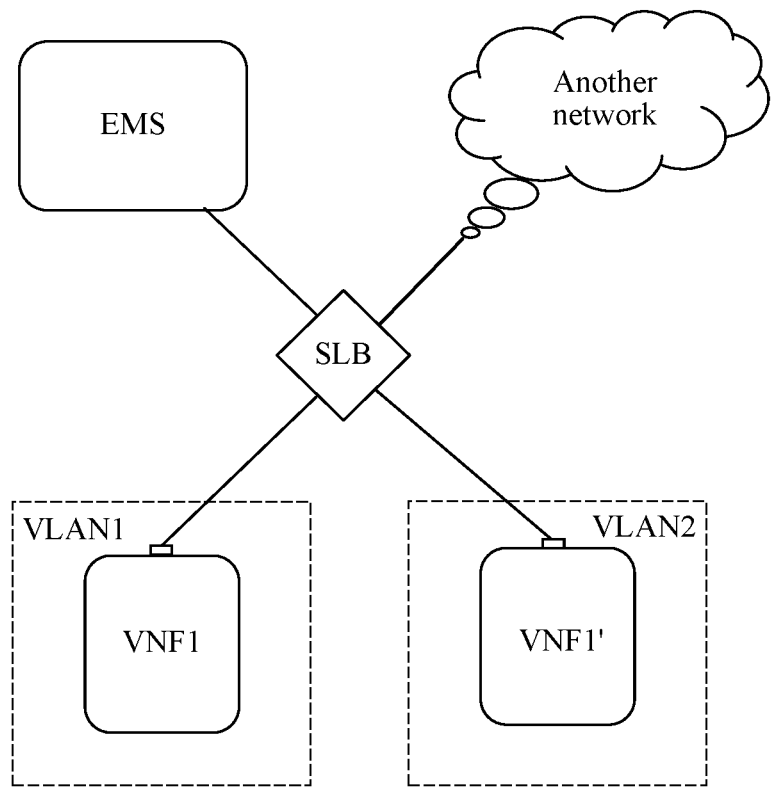
FIG. 2 is a schematic diagram of a system architecture according to an embodiment of the present invention.

A basic principle of the embodiments of the present invention is adding a software load balancer (SLB) to the NFV architecture. The SLB has the following functions: being responsible for sending a signaling message of an external network to a virtualized function device VNF1 and VNF1' of a physical network element, and performing network address translation (NAT) mapping on a request message for sending the VNF1 and VNF1' to the external network, thereby ensuring that a response message can be returned to a message requester by using a same path. When a network element needs to be upgraded, first, image mapping is performed on the virtualized VNF1 of the physical network element to form the VNF1' as a standby virtual network element, and system upgrade is completed for the VNF1'; then, the SLB gradually distributes, from the network element VNF1 to the network element VNF1' according to a preset distribution policy, received service messages sent by another external network element, to complete a hitless network element upgrade process of the network element, thereby avoiding a problem that an overall situation is affected by directly forwarding all service messages to a new network element. For example, FIG. 2 is a schematic diagram of a system architecture according to an embodiment of the present invention. As shown in FIG. 2, an SLB is disposed between another network element and a virtualized VNF1 and VNF1' of a physical network element, and the SLB is connected to an EMS. The EMS delivers a distribution policy to the SLB, and controls a service message sent by the SLB to the VNF1 or the VNF1'. In this way, an SLB module is newly added outside a network element without changing an existing system architecture of the network element, and the internal structure of the network element is blocked. A network element instance is newly added inside the network element, and a message flow is controlled to be switched between new and old instances, thereby preventing system reliability from decreasing during upgrade. The following describes in detail the network element upgrade method provided in the present invention by using specific embodiments.

Embodiment 1

Figure 3:
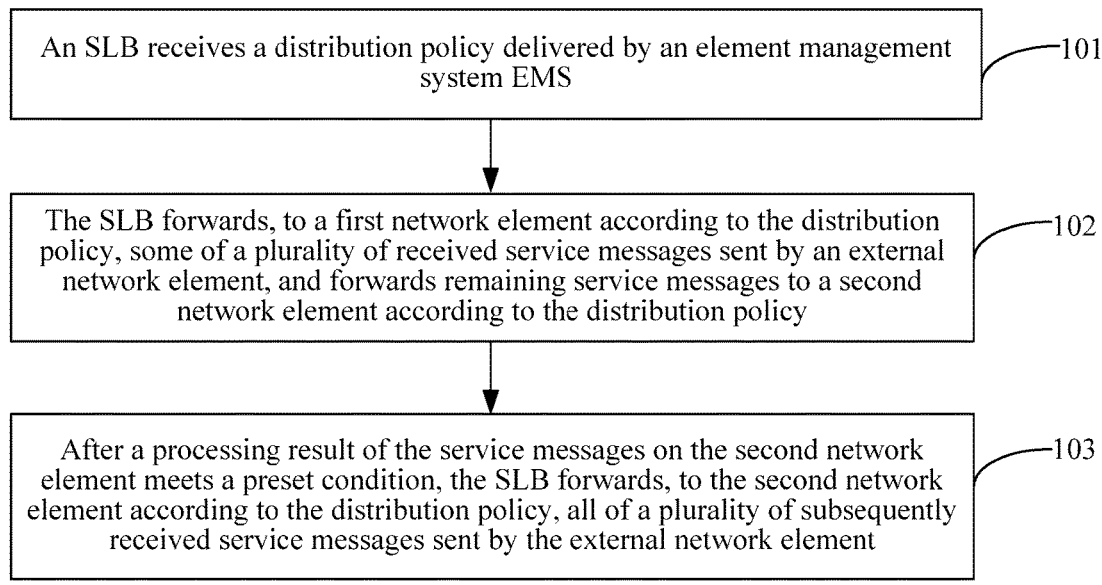
FIG. 3 is a flowchart of a network element upgrade method according to an embodiment of the present invention.

FIG. 3 is a flowchart of a network element upgrade method according to this embodiment of the present invention. As shown in FIG. 3, the method may include the following steps.

Step 101: An SLB receives a distribution policy delivered by an element management system EMS.

The distribution policy is developed by a manager according to a requirement and is sent by the EMS to the SLB. The distribution policy may be used to control a ratio of a quantity of service messages forwarded by the SLB to a first network element to a quantity of service messages forwarded by the SLB to a second network element, and the service messages are a plurality of service messages received by the SLB.

Step 102: The SLB forwards, to a first network element according to the distribution policy, some of a plurality of received service messages sent by an external network element, and forwards remaining service messages to a second network element according to the distribution policy.

The plurality of service messages received by the SLB are a plurality of service messages sent by at least one user that are received by the external network element and that are sent to the first network element. For example, M service messages may be included, where M is an integer greater than 1. Each service message includes a user identifier of a user triggering the service message.

In a network element upgrade scenario on a cloud computing platform, the external network element and the first network element may be virtual network elements. In a network element upgrade scenario on a non-cloud computing platform, the external network element and the first network element may be physical network elements.

It should be noted that systems, components, or objects indicated by terms such as "first", "second", and "another" in this embodiment of the present invention are systems, components, or objects that have particular functions and that are described based on embodiments. The terms are merely for ease of describing the present invention and simplifying descriptions, but are not intended to indicate or imply that the systems, components, or objects must be named as such, and therefore cannot be construed as a limitation on the present invention.

The second network element may be referred to as a standby network element of the first network element, is automatically generated by the EMS, and has a same configuration attribute and connection configuration as the first network element. The second network element and the first network element are located in different local area networks, and network isolation is performed by using a virtual local area network (VLAN) or a virtual extensible local area network (Virtual eXtensible LAN, VXLAN). Therefore, the second network element and the first network element do not perceive each other. Because the second network element has the same configuration attribute and connection configuration as the first network element, in a hitless network element upgrade process, the external network element cannot perceive that a service message sent to the first network element is switched from the first network element to the second network element.

Step 103: After a processing result of the service messages on the second network element meets a preset condition, the SLB forwards, to the second network element according to the distribution policy, all of a plurality of subsequently received service messages sent by the external network element.

The preset condition may be set according to a requirement. This is not limited in this embodiment of the present invention. If the processing result of the service messages on the second network element meets the preset condition, it indicates that the second network element can perform service processing like the first network element. That is, all service messages on the first network element can be forwarded to the second network element. If the processing result of the service messages on the second network element does not meet the preset condition, it indicates that the second network element still has a weak processing capability, and cannot perform service processing like the first network element. That is, all service messages on the first network element cannot be forwarded to the second network element.

Optionally, the preset condition may be one or more of the following cases: all service messages on the second network element are successfully processed; or a success rate of test cases of all service messages on the second network element is greater than or equal to a preset threshold.

That all service messages on the second network element are successfully processed indicates that the second network element can accurately receive a service message sent by an opposite network element. A test case is a program that is compiled by technical personnel and that is used to test whether a service message is successfully processed. A call for a service message on the second network element may be tested in a software environment. The preset threshold may be set according to a requirement, and preferably, may be set to one hundred percent.

Optionally, when the SLB forwards the plurality of service messages to the second network element for running, a system administrator monitors a running status of the plurality of service messages on the second network element in real time. If the running status meets the preset condition, it indicates that the second network element is upgraded normally. If the running status does not meet the preset condition, it indicates that there is a problem during upgrade of the second network element, and the second network element needs to be corrected.

Similarly, the plurality of subsequent service messages may be service messages sent by at least one user that are received by the external network element and that are sent to the first network element, and include at least one service message.

It should be noted that before the running status of the services on the second network element meets the preset condition, step 102 may be repeatedly performed, that is, some service messages may be continually forwarded to the second network element for test running. Quantities of service messages forwarded to the second network element may be the same or may be increased progressively. This is not limited in this embodiment of the present invention.

In this way, in a network element upgrade process, first, the SLB forwards some of service messages to the second network element for test running; then, after a running status on the second network element becomes normal, all of a plurality of subsequently received service messages are forwarded to the second network element. This reduces a risk that all services are damaged by switching all the services to a new network element in the network element upgrade process.

Optionally, the service messages sent by the user may be of various types, for example, Session Initiation Protocol (SIP) messages or Internet Protocol (IP) link messages. Therefore, in this embodiment of the present invention, for ease of distribution of the service messages, different distribution policies may be correspondingly developed for different types of service messages. That is, the distribution policy delivered by the EMS needs to include a correspondence between each different service message and a policy for distributing the service message. The following describes in detail how the SLB forwards, to the first network element according to the distribution policy, the some of the plurality of received service messages sent by the external network element, and forwards the remaining service messages to the second network element according to the distribution policy in step 102.

The SLB determines a message type of each of the plurality of received service messages.

If the SLB determines that the message type of the service message is a Session Initiation Protocol SIP message, the SLB forwards the service message to the first network element or the second network element according to the user identifier included in the SIP message and a distribution identifier and a white list in the distribution policy. The distribution identifier is used to indicate that all of the plurality of service messages received by the SLB are to be forwarded to the first network element, all of the plurality of service messages received by the SLB are to be forwarded to the second network element, or it is uncertain whether to forward the plurality of service messages received by the SLB to the first network element or the second network element, and the white list is used to store at least one user identifier.

If the SLB determines that the service message is an IP link message, the SLB forwards the service message to the first network element or the second network element according to 5-tuple information included in the IP link message and a correspondence between a 5-tuple attribute of a logic link and a virtual local area network identifier VLAN ID that are in the distribution policy.

The 5-tuple information includes an IP address of the external network element, a port number of the external network element, an IP address of the first network element, a port number of the first network element, and a transport protocol type, and the 5-tuple attribute of the logic link includes a source IP address, a source port number, a destination IP address, a destination port number, and a transport protocol type.

If the SLB determines that the service message is neither a SIP message nor an IP link message, the SLB forwards the service message to the second network element.

For ease of determining the message type of the service message by the SLB, before the SLB receives the distribution policy delivered by the EMS, the method may further include:

sending, by the SLB, a synchronization request message to the first network element, where the synchronization request message is used to request to obtain interface information of the first network element, and the interface information of the first network element includes an IP address and a port number of a SIP server of the first network element and configuration information of a logic link for communication between the first network element and the external network element; and receiving and storing, by the SLB, the interface information sent by the first network element, and setting an external interface attribute of the SLB according to the received interface information of the first network element, where the interface attribute includes an IP address and a port number.

Correspondingly, the determining, by the SLB, a message type of the service message may include:

determining the message type of the service message by performing matching between interface information included in the service message and the interface information of the first network element.

According to stipulations in a communication protocol, the SIP message has the following feature: including the IP address and the port number of the SIP server. The port number is agreed on in advance by two communications parties and is fixed. For example, a disclosed default port number in the industry is 5060. The IP link message has the following features: a source end host and a destination end host that communicate with each other perform communication by using a fixed IP address and a fixed port number, and know an IP address and a port number of each other, and use a fixed transport protocol type. The transport protocol type may be the SCTP, the TCP, the UDP, or the like. Therefore, the determining the message type of the service message by performing matching between interface information included in the service message and the interface information of the first network element includes:

determining the service message is a SIP message if the received service message includes a fixed port number; or determining the service message is an IP link message if the received service message includes 5-tuple information.

After receiving the interface information sent by the first network element, the SLB compares a timestamp of the received interface information with a timestamp of locally cached interface information, and if the timestamp of the interface information obtained from the first network element is later than the timestamp of the locally stored interface information, replaces the locally stored interface information with the newly obtained interface information. In addition, when the user delivers a configuration command to the first network element to add or change an external interface of the first network element, the first network element further sends a change notification message to the SLB in real time. The SLB updates information such as the local interface information and the distribution policy after receiving the change notification message.

It should be noted that in this embodiment of the present invention, "source" and "destination" in the source IP address, the source port number, the destination IP address, and the destination port number are specified according to initiation and receiving statuses of a service message. Usually, an IP address and a port number of an end sending a service message are referred to as a source IP address and a source port number, and an IP address and a port number of an end receiving a service message are referred to as a destination IP address and a destination port number.

Figure 4:
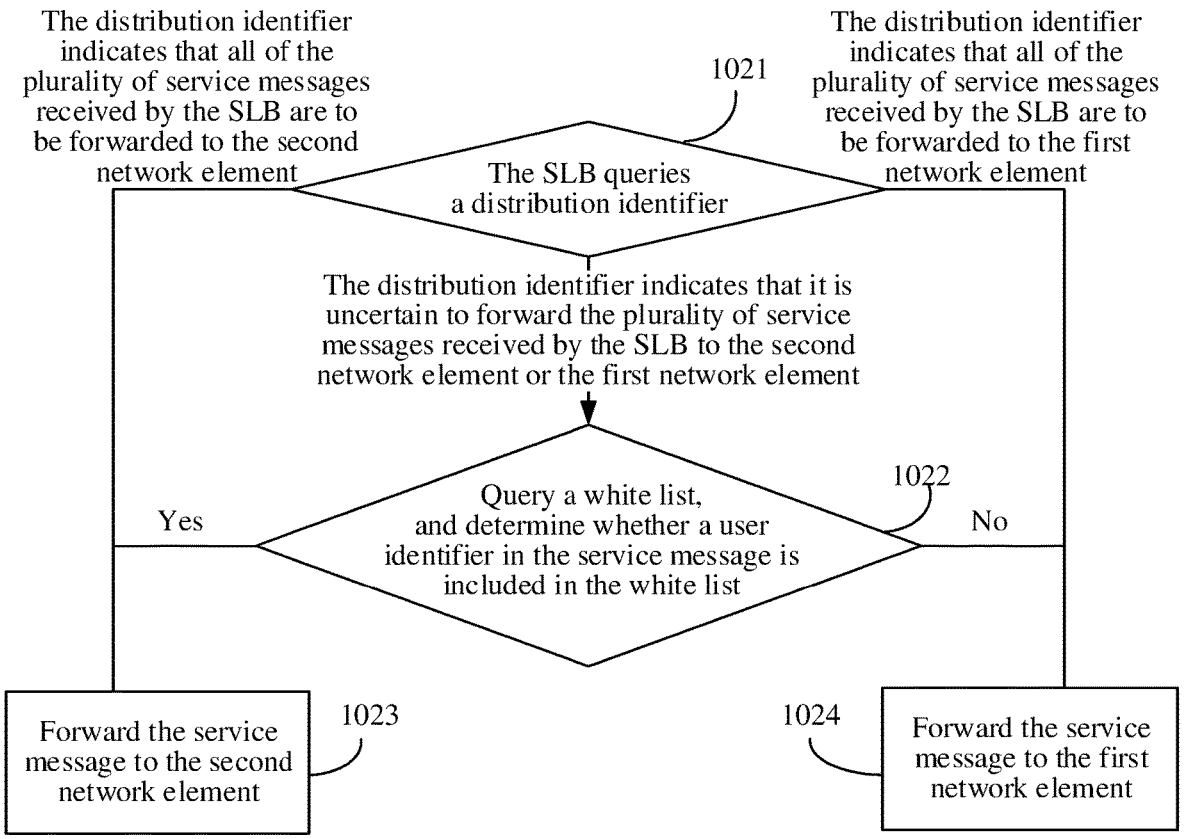
FIG. 4 is a flowchart of a distribution policy according to an embodiment of the present invention.

Specifically, as shown in FIG. 4, the forwarding, by the SLB, the service message to the first network element or the second network element according to the user identifier included in the SIP message and a distribution identifier and a white list in the distribution policy may include the following steps:

Step 1021: The SLB queries the distribution identifier; and if the distribution identifier indicates that it is uncertain whether to forward the plurality of service messages received by the SLB to the first network element or the second network element, performs step 1022;

if the distribution identifier indicates that all of the plurality of service messages received by the SLB are to be forwarded to the second network element, performs step 1023; or if the distribution identifier indicates that all of the plurality of service messages received by the SLB are to be forwarded to the first network element, performs step 1024.

Step 1022: Query the white list, and determine whether the user identifier in the service message is included in the white list. If the user identifier in the service message is included in the white list, perform step 1024; or if the user identifier in the service message is not included in the white list, perform step 1025.

Step 1023: Forward the service message to the second network element.

Step 1024: Forward the service message to the first network element.

The distribution identifier may be a numerical symbol or a symbol in another form. This is not limited in this embodiment of the present invention. For example, a distribution identifier "0" may be used to indicate that it is uncertain whether to forward all of the plurality of service messages received by the SLB to the first network element or the second network element, a distribution identifier "1" may be used to indicate that all of the plurality of service messages received by the SLB are to be forwarded to the second network element, and a distribution identifier "2" may be used to indicate that all of the plurality of service messages received by the SLB are to be forwarded to the first network element.

For example, the following Table 1 includes a distribution identifier and a white list. In this case, if the user identifier included in the service message is a user 2, the service message is to be forwarded to the second network element; or if the user identifier included in the service message is a user 4, the service message is to be forwarded to the first network element.

TABLE 1

| Distribution identifier | White list |
|---|---|
| 0 | User 1 |
|   | User 2 |
|   | User 3 |

Correspondingly, in the distribution policy in the subsequent step 103, the distribution identifier included in the distribution policy may be set as identifier information used to indicate that the service message is to be forwarded to the second network element, so that the SLB distributes, according to the distribution policy, all of the plurality of subsequently received service messages to the second network element.

Specifically, the forwarding, by the SLB, the service message to the first network element or the second network element according to 5-tuple information included in the IP link message and a correspondence between a 5-tuple attribute of a logic link and a virtual local area network identifier VLAN ID that are in the distribution policy may include:

determining, according to the correspondence between a 5-tuple attribute of a logic link and a virtual local area network identifier VLAN ID that are in the distribution policy, a first virtual local area network identifier VLAN ID corresponding to the service message, where the first VLAN ID is used to identify a first virtual local area network, and the first virtual local area network includes the first network element or the second network element; and forwarding, according to a correspondence between a network element and a virtual local area network identifier VLAN ID of a virtual local area network in which the network element is located, the service message to a network element corresponding to the first VLAN ID.

The correspondence between a 5-tuple attribute of a logic link and a virtual local area network identifier VLAN ID is used to control a quantity of logic links for forwarding service messages to the second network element, and may be set according to a requirement. This is not limited in this embodiment of the present invention. In the network element upgrade process, when the user specifies a user whitelist on the EMS, the system calculates, according to a ratio of a quantity of whitelisted users to a total quantity of users on the system, a total quantity of logic links connecting the first network element and peripheral network elements into a quantity of logic links for distribution to the second network element of a new version, and changes a distribution policy for a corresponding quantity of logic links to distribution to the second network element. For example, if a user capacity of the first network element is 10000, there are four links connecting the first network element and peripheral network elements, and calls from 2500 users are expected to be distributed to the second network element of the new version, the SLB forwards a service message on one of the logic links to the second network element, and forwards service messages on the other three logic links still to the first network element.

For example, if an identifier of a virtual local area network in which the first network element is located is VLAN1, an identifier of a virtual local area network in which the second network element is located is VLAN2, the external network element has an IP address of 20.20.10.2/24 and includes four ports whose port numbers are 01, 02, 03, and 04 respectively, the first network element has an IP address of 10.10.1.1/24 and includes four ports whose port numbers are 0A, 0B, 0C, and 0D respectively, and a transport protocol type between the external network element and the first network element is the TCP, the following four logic links for transmitting service messages may be formed between the external network element and the first network element: 20.20.10.2/24, 01, 10.10.1.1/24, 0A, TCP; 20.20.10.2/24, 02, 10.10.1.1/24, 0B, TCP; 20.20.10.2/24, 03, 10.10.1.1/24, 0C, TCP; and 20.20.10.2/24, 04, 10.10.1.1/24, 0D, TCP. Because the second network element has the same configuration attribute and connection configuration as the first network element, the foregoing four logic links may also be formed between the second network element and the external network element. In this case, if a service message sent on the logic link: 20.20.10.2/24, 04, 10.10.1.1/24, 0D, TCP is forwarded to the second network element to implement switching of some service messages that are sent to the first network element to the second network element, a correspondence shown in the following Table 2 needs to be preset.

In this case, if a 5-tuple attribute included in the received service message is 20.20.10.2/24, 03, 10.10.1.1/24, 0C, TCP, it can be learned from Table 2 that the service message is to be forwarded to the first network element; or if a 5-tuple attribute included in the received service message is 20.20.10.2/24, 04, 10.10.1.1/24, 0D, TCP, it can be learned from Table 2 that the service message is to be forwarded to the second network element.

TABLE 2

| Logic link | VLAN ID |
|---|---|
| 20.20.10.2/24, 01, 10.10.1.1/24, 0A, TCP | VLAN1 |
| 20.20.10.2/24, 02, 10.10.1.1/24, 0B, TCP | VLAN1 |
| 20.20.10.2/24, 03, 10.10.1.1/24, 0C, TCP | VLAN1 |
| 20.20.10.2/24, 04, 10.10.1.1/24, 0D, TCP | VLAN2 |

Correspondingly, in the subsequent distribution policy, all the logic links may be set to correspond to the identifier VLAN ID of the virtual local area network in which the second network element is located, so that the SLB forwards all of subsequently received IP link messages to the second network element.

Further, according to this embodiment of the present invention, further, the SLB may forward, to an external network element, a service message sent by a network element inside the system, and return, after receiving a response message sent by the external network element, the response message to the internal network element by using a same path. Details are as follows:

If the SLB receives a first service message sent by the first network element or the second network element, the SLB changes a source port number in the first service message, and records, in a first relationship table, the changed source port number and a correspondence between the source port number and a virtual local area network identifier VLAN ID of a virtual local area network in which the network element sending the first service message is located;

forwards the first service message including the changed source port number to the external network element;

receives a response message returned by the external network element, where the response message includes a destination port number, and the destination port number is the changed source port number;

queries the first relationship table, to obtain a port number and a virtual local area network identifier VLAN ID that correspond to the destination port number; and sends the response message to a port of a network element in a virtual local area network identified by the virtual local area network identifier VLAN ID.

The first service message is a non-IP link message and includes a source IP address, a source port number, a destination IP address, and a destination port number.

It should be noted that because two communications parties can be uniquely determined by using one logic link, for an IP link message, a response message can still be returned by using a same path and by using a method without port changing or port mapping. Therefore, in this embodiment of the present invention, the first service message is only a non-IP link message, and may include a SIP message and another message that is different from the SIP message and the IP link message.

For example, the first network element is located in the VLAN1, the second network element is located in the VLAN2, and the two network elements have a common port 1002. In this case, a message sent by the first network element and indicating that a source port number is 1002 may be changed to a message indicating that a port number is 31002, and a message sent by the second network element and indicating that a source port number is 1002 may be changed to a message indicating that a port number is 21002, and the foregoing information is recorded in Table 3. If a sent message indicating that a destination port number is 21002 is received by the SLB, it can be learned from Table 3 that the message is to be sent to the port 1002 of the second network element in the VLAN2; or if a sent message indicating that a destination port number is 31002 is received by the SLB, it can be learned from Table 3 that the message is to be sent to the port 1002 of the first network element in the VLAN1.

TABLE 3

| Port number after change | Port number before change | VLAN ID |
|---|---|---|
| 21002 | 1002 | VLAN2 |
| 31002 | 1002 | VLAN1 |

It can be learned from the foregoing that the network element upgrade method provided in this embodiment of the present invention includes: receiving, by the SLB, the distribution policy delivered by the EMS; forwarding, to the first network element according to the distribution policy, the some of the plurality of received service messages sent by the external network element, and forwarding the remaining service messages to the second network element according to the distribution policy; and after the processing result of the service messages on the second network element meets the preset condition, forwarding, by the SLB to the second network element according to the distribution policy, all of the plurality of subsequently received service messages sent by the external network element. In this way, in a network element upgrade process, first, the SLB forwards some of service messages to the second network element for test running; then, after a running status on the second network element becomes normal, all of a plurality of subsequently received service messages are forwarded to the second network element. This reduces a risk that all services are damaged by switching all the services to a new network element in the network element upgrade process. In addition, an existing system architecture of a network element is not changed, only an SLB module is newly added outside the network element, and the internal structure of the network element is blocked. A network element instance is newly added inside the network element, and a message flow is controlled to be switched between new and old network elements, thereby preventing system reliability from decreasing during upgrade and meeting a telecommunication-level high reliability requirement.

Embodiment 2

Figure 5:
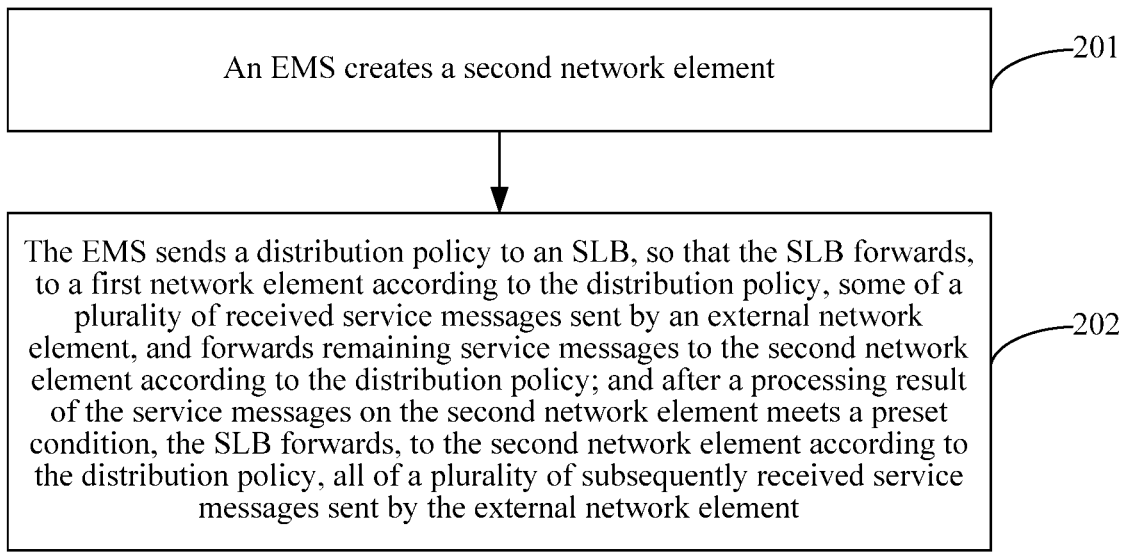
FIG. 5 is a flowchart of a network upgrade method according to an embodiment of the present invention.

FIG. 5 is a flowchart of another network element upgrade method according to this embodiment of the present invention. As shown in FIG. 5, the method may include the following steps.

Step 201: An EMS creates a second network element.

The second network element has a same configuration attribute and connection configuration as a first network element. The second network element and the first network element are located in different virtual local area networks, and are isolated by using the VLANs, thereby avoiding an IP conflict. A version of the second network element is not lower than a version of the first network element. In addition, in a process of creating the second network element, an external network element does not perceive an overall change, and data of an interface between the external network element and the second network element does not need to be added to the external network element.

Specifically, the creating, by an EMS, a second network element may include:

instructing, by the EMS by using a virtualized network function manager VNFM, a virtualized infrastructure manager VIM in which the first network element is located to create a virtual machine image file of the first network element;

instructing, by the EMS, the VIM to create a virtual machine of the first network element; and embedding, by the EMS, the virtual machine image file of the first network element into the created virtual machine, to form the second network element.

Step 202: The EMS sends a distribution policy to an SLB, so that the SLB forwards, to a first network element according to the distribution policy, some of a plurality of received service messages sent by an external network element, and forwards remaining service messages to the second network element according to the distribution policy; and after a processing result of the service messages on the second network element meets a preset condition, the SLB forwards, to the second network element according to the distribution policy, all of a plurality of subsequently received service messages sent by the external network element.

The distribution policy is developed by a manager according to a requirement and is sent by the EMS to the SLB. The distribution policy may be used to control a ratio of a quantity of service messages forwarded by the SLB to the first network element to a quantity of service messages forwarded by the SLB to the second network element, and the service messages are a plurality of service messages received by the SLB.

Further, to improve resource utilization, in this embodiment of the present invention, the newly created second network element is a minimum function set of the first network element. When more service messages are gradually distributed to the second network element, the second network element implements automatic scale-out by using an auto scaling function. The first network element automatically implements scale-in because of a reduction in a quantity of services. In this way, a virtual machine released after scale-in of the first network element may be moved to the second network element for use, and infrastructure resource consumption can be reduced in this manner. Details are as follows:

The EMS reduces a virtual machine resource of the first network element according to a quantity of reduced service messages that are processed on the first network element; and after the SLB forwards all of the plurality of received service messages to the second network element, the EMS deletes the first network element to release virtual machine resources on the first network element.

It can be learned from the foregoing that according to the network element upgrade method provided in this embodiment of the present invention, the EMS creates the second network element, where the second network element has the same configuration attribute and connection configuration as the first network element, the second network element and the first network element are located in the different virtual local area networks, and the version of the second network element is not lower than the version of the first network element; and sends the distribution policy to the SLB, so that the SLB forwards, to the first network element according to the distribution policy, the some of the plurality of received service messages sent by the external network element, and forwards the remaining service messages to the second network element according to the distribution policy; and after the processing result of the service messages on the second network element meets the preset condition, the SLB forwards, to the second network element according to the distribution policy, all of the plurality of subsequently received service messages sent by the external network element. In this way, in a network element upgrade process, first, the SLB forwards some of service messages to the second network element for test running; then, after a running status on the second network element becomes normal, all of a plurality of subsequently received service messages are forwarded to the second network element. This reduces a risk that all services are damaged by switching all the services to a new network element in the network element upgrade process.

Embodiment 3

Figure 6:
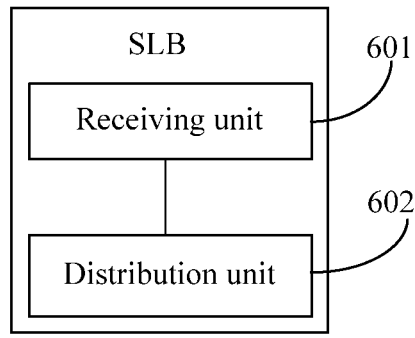
FIG. 6 is a structural diagram of an SLB according to an embodiment of the present invention.

FIG. 6 is a structural diagram of a software load balancer SLB 60 according to this embodiment of the present invention. As shown in FIG. 6, the SLB 60 may include a receiving unit 601 and a distribution unit 602.

The receiving unit 601 is configured to receive a distribution policy delivered by an element management system EMS.

The distribution policy is developed by a manager according to a requirement and is sent by the EMS to the SLB. The distribution policy may be used to control a ratio of a quantity of service messages forwarded by the SLB to a first network element to a quantity of service messages forwarded by the SLB to a second network element, and the service messages are a plurality of service messages received by the SLB.

The distribution unit 602 is configured to: forward, to the first network element according to the distribution policy, some of a plurality of received service messages sent by an external network element, and forward remaining service messages to the second network element according to the distribution policy; and after a processing result of the service messages on the second network element meets a preset condition, forward, to the second network element according to the distribution policy, all of a plurality of subsequently received service messages sent by the external network element.

The plurality of service messages received by the receiving unit 601 are a plurality of service messages sent by at least one user that are received by the external network element and that are sent to the first network element. For example, M service messages may be included, where M is an integer greater than 1. Each service message includes a user identifier of a user triggering the service message.

In a network element upgrade scenario on a cloud computing platform, the external network element and the first network element may be virtual network elements. In a network element upgrade scenario on a non-cloud computing platform, the external network element and the first network element may be physical network elements.

It should be noted that systems, components, or objects indicated by terms such as "first", "second", and "another" in this embodiment of the present invention are systems, components, or objects that have particular functions and that are described based on embodiments. The terms are merely for ease of describing the present invention and simplifying descriptions, but are not intended to indicate or imply that the systems, components, or objects must be named as such, and therefore cannot be construed as a limitation on the present invention.

The second network element may be referred to as a standby network element of the first network element, is automatically generated by the EMS, and has a same configuration attribute and connection configuration as the first network element. The second network element and the first network element are located in different local area networks, and network isolation is performed by using a virtual local area network (VLAN) or a virtual extensible local area network (Virtual eXtensible LAN, VXLAN). Therefore, the second network element and the first network element do not perceive each other. Because the second network element has the same configuration attribute and connection configuration as the first network element, in a hitless network element upgrade process, the external network element cannot perceive that a service message sent to the first network element is switched from the first network element to the second network element.

The preset condition may be set according to a requirement. This is not limited in this embodiment of the present invention. If the processing result of the service messages on the second network element meets the preset condition, it indicates that the second network element can perform service processing like the first network element. That is, all service messages on the first network element can be forwarded to the second network element. If the processing result of the service messages on the second network element does not meet the preset condition, it indicates that the second network element still has a weak processing capability, and cannot perform service processing like the first network element. That is, all service messages on the first network element cannot be forwarded to the second network element.

Optionally, when the SLB forwards the plurality of service messages to the second network element for running, a system administrator monitors a running status of the plurality of service messages on the second network element in real time. If the running status meets the preset condition, it indicates that the second network element is upgraded normally. If the running status does not meet the preset condition, it indicates that there is a problem during upgrade of the second network element, and the second network element needs to be corrected.

It should be noted that before the running status of the services on the second network element meets the preset condition, some service messages may be continually forwarded to the second network element for test running. Quantities of service messages forwarded to the second network element may be the same or may be increased progressively. This is not limited in this embodiment of the present invention.

Optionally, the service messages sent by the user may be of various types, for example, Session Initiation Protocol (SIP) messages or Internet Protocol (IP) link messages. Therefore, in this embodiment of the present invention, for ease of distribution of the service messages, different distribution policies may be correspondingly developed for different types of service messages. That is, the distribution policy delivered by the EMS needs to include a correspondence between each different service message and a policy for distributing the service message. The distribution unit is configured to:

determine a message type of each of the plurality of received service messages; and if the message type of the service message is a Session Initiation Protocol SIP message, forward the service message to the first network element or the second network element according to the user identifier included in the SIP message and a distribution identifier and a white list in the distribution policy, where the distribution identifier is used to indicate that all of the plurality of service messages received by the SLB are to be forwarded to the first network element, all of the plurality of service messages received by the SLB are to be forwarded to the second network element, or it is uncertain whether to forward the plurality of service messages received by the SLB to the first network element or the second network element, and the white list is used to store at least one user identifier;

if the service message is an IP link message, forward the service message to the first network element or the second network element according to 5-tuple information included in the IP link message and a correspondence between a 5-tuple attribute of a logic link and a virtual local area network identifier VLAN ID that are in the distribution policy, where the 5-tuple information includes an IP address of the external network element, a port number of the external network element, an IP address of the first network element, a port number of the first network element, and a transport protocol type, and the 5-tuple attribute of the logic link includes a source IP address, a source port number, a destination IP address, a destination port number, and a transport protocol type; or if the service message is neither a SIP message nor an IP link message, forward the service message to the second network element.

Figure 6A:
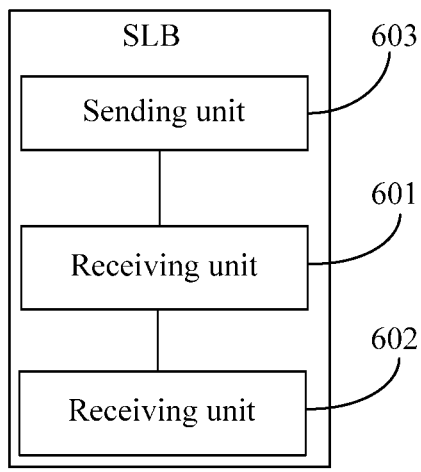
FIG. 6A is a structural diagram of an SLB according to an embodiment of the present invention.

For ease of determining the message type of the service message by the distribution unit, as shown in FIG. 6A, the SLB 60 may further include:

a sending unit 603, configured to: before the receiving unit 601 receives the distribution policy delivered by the EMS, send a synchronization request message to the first network element. The synchronization request message is used to request to obtain interface information of the first network element, and the interface information of the first network element includes an IP address and a port number of a SIP server of the first network element and configuration information of a logic link for communication between the first network element and the external network element.

The receiving unit 601 is further configured to receive and store the interface information sent by the first network element.

The distribution unit is configured to: set an external interface attribute of the SLB according to the received interface information of the first network element, where the interface attribute includes an IP address and a port number; and determine the message type of the service message by performing matching between interface information included in the service message and the interface information sent by the first network element.

After receiving the interface information sent by the first network element, the receiving unit 601 compares a timestamp of the received interface information with a timestamp of locally cached interface information, and if the timestamp of the interface information obtained from the first network element is later than the timestamp of the locally stored interface information, replaces the locally stored interface information with the newly obtained interface information. In addition, when the user delivers a configuration command to the first network element to add or change an external interface of the first network element, the first network element further sends a change notification message to the SLB in real time. The SLB updates information such as the local interface information and the distribution policy after receiving the change notification message.

Further, the distribution unit 602 is configured to:

query the distribution identifier; and query the white list if the distribution identifier indicates that it is uncertain whether to forward the plurality of service messages received by the SLB to the first network element or the second network element, and forward the service message to the second network element if the user identifier in the service message is included in the white list, or forward the service message to the first network element if the user identifier in the service message is not included in the white list;

forward the service message to the second network element if the distribution identifier indicates that all of the plurality of service messages received by the SLB are to be forwarded to the second network element; or forward the service message to the first network element if the distribution identifier indicates that all of the plurality of service messages received by the SLB are to be forwarded to the first network element.

The distribution identifier may be a numerical symbol or a symbol in another form. This is not limited in this embodiment of the present invention. For example, a distribution identifier "0" may be used to indicate that it is uncertain whether to forward all of the plurality of service messages received by the SLB to the first network element or the second network element, a distribution identifier "1" may be used to indicate that all of the plurality of service messages received by the SLB are to be forwarded to the second network element, and a distribution identifier "2" may be used to indicate that all of the plurality of service messages received by the SLB are to be forwarded to the first network element.

Further, the distribution unit 602 is configured to:

determine, according to the correspondence between a 5-tuple attribute of a logic link and a virtual local area network identifier VLAN ID that are in the distribution policy, a first virtual local area network identifier VLAN ID corresponding to the service message, where the first VLAN ID is used to identify a first virtual local area network, and the first virtual local area network includes the first network element or the second network element; and forward, according to a correspondence between a network element and a virtual local area network identifier VLAN ID of a virtual local area network in which the network element is located, the service message to a network element corresponding to the first VLAN ID.

The correspondence between a 5-tuple attribute of a logic link and a virtual local area network identifier VLAN ID is used to control a quantity of logic links for forwarding service messages to the second network element, and may be set according to a requirement. This is not limited in this embodiment of the present invention. In the network element upgrade process, when the user specifies a user whitelist on the EMS, the system calculates, according to a ratio of a quantity of whitelisted users to a total quantity of users on the system, a total quantity of logic links connecting the first network element and peripheral network elements into a quantity of logic links for distribution to the second network element of a new version, and changes a distribution policy for a corresponding quantity of logic links to distribution to the second network element. For example, if a user capacity of the first network element is 10000, there are four links connecting the first network element and peripheral network elements, and calls from 2500 users are expected to be distributed to the second network element of the new version, the SLB forwards a service message on one of the logic links to the second network element, and forwards service messages on the other three logic links still to the first network element.

Further, according to this embodiment of the present invention, to forward, to an external network element, a service message sent by a network element inside the system, and return, after a response message sent by the external network element is received, the response message to the internal network element by using a same path, the receiving unit 601 is further configured to:

receive a first service message sent by the first network element or the second network element.

The distribution unit 602 is further configured to: change a source port number in the first service message, and record, in a first relationship table, the changed source port number and a correspondence between the source port number and a virtual local area network identifier VLAN ID of a virtual local area network in which the network element sending the first service message is located; and forward the first service message including the changed source port number to the external network element.

The receiving unit 601 is further configured to receive a response message returned by the external network element. The response message includes a destination port number, and the destination port number is the changed source port number.

The distribution unit 602 is further configured to: query the first relationship table, to obtain a port number and a virtual local area network identifier VLAN ID that correspond to the destination port number; and send the response message to a port of a network element in a virtual local area network identified by the virtual local area network identifier VLAN ID.

The first service message is a non-IP link message and includes a source IP address, a source port number, a destination IP address, and a destination port number.

It should be noted that because two communications parties can be uniquely determined by using one logic link, for an IP link message, a response message can still be returned by using a same path and by using a method without port changing or port mapping. Therefore, in this embodiment of the present invention, the first service message is only a non-IP link message, and may include a SIP message and another message that is different from the SIP message and the IP link message.

For example, the first network element is located in a VLAN1, the second network element is located in a VLAN2, and the two network elements have a common port 1002. In this case, a message sent by the first network element and indicating that a source port number is 1002 may be changed to a message indicating that a port number is 31002, and a message sent by the second network element and indicating that a source port number is 1002 may be changed to a message indicating that a port number is 21002, and the foregoing information is recorded in Table 3. If a sent message indicating that a destination port number is 21002 is received by the SLB, it can be learned from Table 3 that the message is to be sent to the port 1002 of the second network element in the VLAN2; or if a sent message indicating that a destination port number is 31002 is received by the SLB, it can be learned from Table 3 that the message is to be sent to the port 1002 of the first network element in the VLAN1.

It can be learned from the foregoing that the SLB provided in this embodiment of the present invention receives the distribution policy delivered by the EMS; forwards, to the first network element according to the distribution policy, the some of the plurality of received service messages sent by the external network element, and forwards the remaining service messages to the second network element according to the distribution policy; and after the processing result of the service messages on the second network element meets the preset condition, forwards, to the second network element according to the distribution policy, all of the plurality of subsequently received service messages sent by the external network element. In this way, in a network element upgrade process, first, the SLB forwards some of service messages to the second network element for test running; then, after a running status on the second network element becomes normal, all of a plurality of subsequently received service messages are forwarded to the second network element. This reduces a risk that all services are damaged by switching all the services to a new network element in the network element upgrade process. In addition, an existing system architecture of a network element is not changed, only an SLB module is newly added outside the network element, and the internal structure of the network element is blocked. A network element instance is newly added inside the network element, and a message flow is controlled to be switched between new and old network elements, thereby preventing system reliability from decreasing during upgrade and meeting a telecommunication-level high reliability requirement.

Embodiment 4

Figure 7:
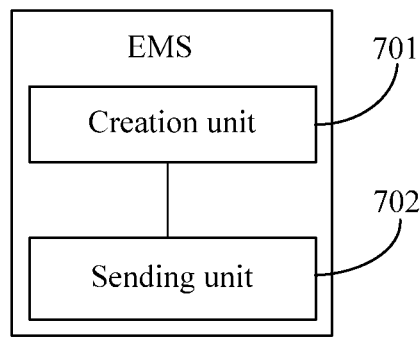
FIG. 7 is a structural diagram of an EMS according to an embodiment of the present invention.

FIG. 7 is a structural diagram of an element management system EMS 70 according to this embodiment of the present invention. As shown in FIG. 7, the EMS may include a creation unit 701 and a sending unit 702.

The creation unit 701 is configured to create a second network element. The second network element has a same configuration attribute and connection configuration as a first network element, the second network element and the first network element are located in different virtual local area networks, and a version of the second network element is not lower than a version of the first network element.

The second network element has a same configuration attribute and connection configuration as the first network element. The second network element and the first network element are located in different virtual local area networks, and are isolated by using the VLANs, thereby avoiding an IP conflict. A version of the second network element is not lower than a version of the first network element. In addition, in a process of creating the second network element, an external network element does not perceive an overall change, and data of an interface between the external network element and the second network element does not need to be added to the external network element.

The sending unit 702 is configured to send a distribution policy to an SLB, so that the SLB forwards, to the first network element according to the distribution policy, some of a plurality of received service messages sent by an external network element, and forwards remaining service messages to the second network element according to the distribution policy; and after a processing result of the service messages on the second network element meets a preset condition, the SLB forwards, to the second network element according to the distribution policy, all of a plurality of subsequently received service messages sent by the external network element.

The distribution policy is developed by a manager according to a requirement and is sent by the EMS to the SLB. The distribution policy may be used to control a ratio of a quantity of service messages forwarded by the SLB to the first network element to a quantity of service messages forwarded by the SLB to the second network element, and the service messages are a plurality of service messages received by the SLB.

Further, the creation unit 701 is configured to:

instruct, by using a virtualized network function manager VNFM, a virtualized infrastructure manager VIM in which the first network element is located to create a virtual machine image file of the first network element;

instruct the VIM to create a virtual machine of the first network element; and embed the virtual machine image file of the first network element into the created virtual machine, to form the second network element.

Further, to improve resource utilization, in this embodiment of the present invention, the newly created second network element is a minimum function set of the first network element. When more service messages are gradually distributed to the second network element, the second network element implements automatic scale-out by using an auto scaling function. The first network element automatically implements scale-in because of a reduction in a quantity of services. In this way, a virtual machine released by means of scale-in of the first network element may be moved to the second network element for use, and infrastructure resource consumption can be reduced in this manner. A specific implementation is as follows:

The creation unit 701 is further configured to reduce a virtual machine resource of the first network element according to a quantity of reduced service messages that are processed on the first network element; and after the SLB forwards all of the plurality of received service messages to the second network element, delete the first network element to release virtual machine resources on the first network element.

It can be learned from the foregoing that the EMS provided in this embodiment of the present invention creates the second network element, where the second network element has the same configuration attribute and connection configuration as the first network element, the second network element and the first network element are located in the different virtual local area networks, and the version of the second network element is not lower than the version of the first network element; and sends the distribution policy to the SLB, so that the SLB forwards, to the first network element according to the distribution policy, the some of the plurality of received service messages sent by the external network element, and forwards the remaining service messages to the second network element according to the distribution policy; and after the processing result of the service messages on the second network element meets the preset condition, the SLB forwards, to the second network element according to the distribution policy, all of the plurality of subsequently received service messages sent by the external network element. In this way, in a network element upgrade process, first, the SLB forwards some of service messages to the second network element for test running; then, after a running status on the second network element becomes normal, all of a plurality of subsequently received service messages are forwarded to the second network element. This reduces a risk that all services are damaged by switching all the services to a new network element in the network element upgrade process.

Embodiment 5

Figure 8:
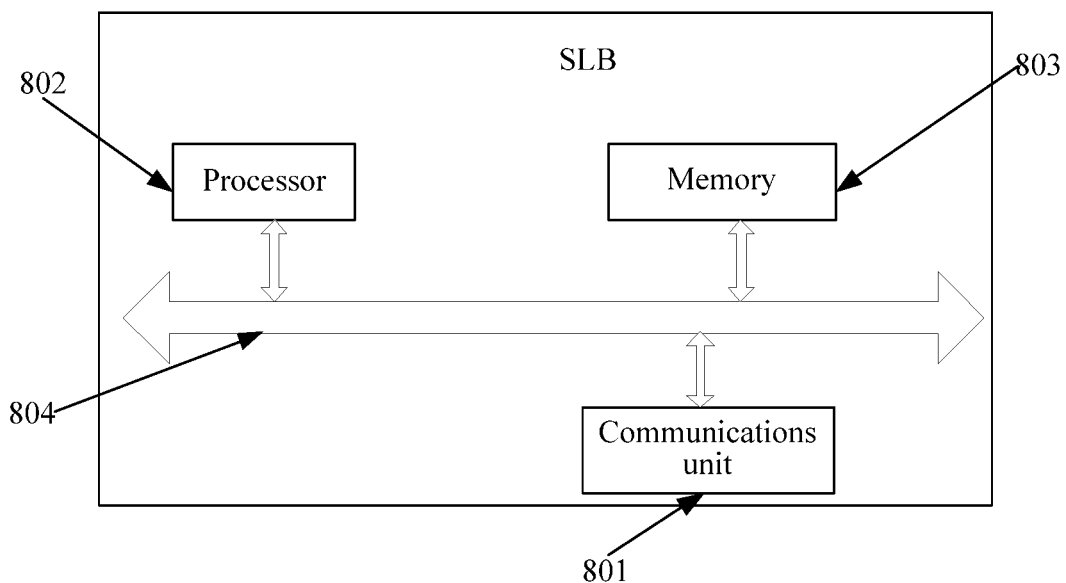
FIG. 8 is a structural diagram of an SLB according to an embodiment of the present invention.

FIG. 8 is a structural diagram of a software load balancer SLB 80 according to this embodiment of the present invention. As shown in FIG. 8, the SLB 80 may include a communications unit 801, a processor 802, a memory 803, and at least one communications bus 804 configured to implement connections and mutual communication between the apparatuses.

The communications unit 801 is configured to perform data transmission with an external network element.

The processor 802 may be a central processing unit (CPU for short).

The memory 803 may be a volatile memory, such as a random access memory (RAM for short); or a non-volatile memory, such as a read-only memory (ROM for short), a flash memory, a hard disk drive (HDD for short), or a solid-state drive (SSD for short); or a combination of the foregoing types of memories; and provide instructions and data to the processor 802.

The communications unit 801 is configured to receive a distribution policy delivered by an element management system EMS.

The distribution policy is developed by a manager according to a requirement and is sent by the EMS to the SLB. The distribution policy may be used to control a ratio of a quantity of service messages forwarded by the SLB to a first network element to a quantity of service messages forwarded by the SLB to a second network element, and the service messages are a plurality of service messages received by the SLB.

The processor 802 is configured to: forward, to the first network element according to the distribution policy, some of a plurality of received service messages sent by an external network element, and forward remaining service messages to the second network element according to the distribution policy; and after a processing result of the service messages on the second network element meets a preset condition, forward, to the second network element according to the distribution policy, all of a plurality of subsequently received service messages sent by the external network element.

The plurality of service messages received by the communications unit 801 are a plurality of service messages sent by at least one user that are received by the external network element and that are sent to the first network element. For example, M service messages may be included, where M is an integer greater than 1. Each service message includes a user identifier of a user triggering the service message.

In a network element upgrade scenario on a cloud computing platform, the external network element and the first network element may be virtual network elements. In a network element upgrade scenario on a non-cloud computing platform, the external network element and the first network element may be physical network elements.

It should be noted that systems, components, or objects indicated by terms such as "first", "second", and "another" in this embodiment of the present invention are systems, components, or objects that have particular functions and that are described based on embodiments. The terms are merely for ease of describing the present invention and simplifying descriptions, but are not intended to indicate or imply that the systems, components, or objects must be named as such, and therefore cannot be construed as a limitation on the present invention.

The second network element may be referred to as a standby network element of the first network element, is automatically generated by the EMS, and has a same configuration attribute and connection configuration as the first network element. The second network element and the first network element are located in different local area networks, and network isolation is performed by using a virtual local area network (VLAN) or a virtual extensible local area network (Virtual eXtensible LAN, VXLAN). Therefore, the second network element and the first network element do not perceive each other. Because the second network element has the same configuration attribute and connection configuration as the first network element, in a hitless network element upgrade process, the external network element cannot perceive that a service message sent to the first network element is switched from the first network element to the second network element.

The preset condition may be set according to a requirement. This is not limited in this embodiment of the present invention. If the processing result of the service messages on the second network element meets the preset condition, it indicates that the second network element can perform service processing like the first network element. That is, all service messages on the first network element can be forwarded to the second network element. If the processing result of the service messages on the second network element does not meet the preset condition, it indicates that the second network element still has a weak processing capability, and cannot perform service processing like the first network element. That is, all service messages on the first network element cannot be forwarded to the second network element.

Optionally, when the SLB forwards the plurality of service messages to the second network element for running, a system administrator monitors a running status of the plurality of service messages on the second network element in real time. If the running status meets the preset condition, it indicates that the second network element is upgraded normally. If the running status does not meet the preset condition, it indicates that there is a problem during upgrade of the second network element, and the second network element needs to be corrected.

It should be noted that before the running status of the services on the second network element meets the preset condition, some service messages may be continually forwarded to the second network element for test running. Quantities of service messages forwarded to the second network element may be the same or may be increased progressively. This is not limited in this embodiment of the present invention.

Optionally, the service messages sent by the user may be of various types, for example, Session Initiation Protocol (SIP) messages or Internet Protocol (IP) link messages. Therefore, in this embodiment of the present invention, for ease of distribution of the service messages, different distribution policies may be correspondingly developed for different types of service messages. That is, the distribution policy delivered by the EMS needs to include a correspondence between each different service message and a policy for distributing the service message. The processor 802 is configured to:

determine a message type of each of the plurality of received service messages; and if the message type of the service message is a Session Initiation Protocol SIP message, forward the service message to the first network element or the second network element according to the user identifier included in the SIP message and a distribution identifier and a white list in the distribution policy, where the distribution identifier is used to indicate that all of the plurality of service messages received by the SLB are to be forwarded to the first network element, all of the plurality of service messages received by the SLB are to be forwarded to the second network element, or it is uncertain whether to forward the plurality of service messages received by the SLB to the first network element or the second network element, and the white list is used to store at least one user identifier;

if the service message is an IP link message, forward the service message to the first network element or the second network element according to 5-tuple information included in the IP link message and a correspondence between a 5-tuple attribute of a logic link and a virtual local area network identifier VLAN ID that are in the distribution policy, where the 5-tuple information includes an IP address of the external network element, a port number of the external network element, an IP address of the first network element, a port number of the first network element, and a transport protocol type, and the 5-tuple attribute of the logic link includes a source IP address, a source port number, a destination IP address, a destination port number, and a transport protocol type; or if the service message is neither a SIP message nor an IP link message, forward the service message to the second network element.

For ease of determining the message type of the service message by the distribution unit, the communications unit 801 is further configured to:

before the communications unit 801 receives the distribution policy delivered by the EMS, send a synchronization request message to the first network element. The synchronization request message is used to request to obtain interface information of the first network element, and the interface information of the first network element includes an IP address and a port number of a SIP server of the first network element and configuration information of a logic link for communication between the first network element and the external network element.

The communications unit 801 is further configured to receive and store the interface information sent by the first network element.

The distribution unit is configured to: set an external interface attribute of the SLB according to the received interface information of the first network element, where the interface attribute includes an IP address and a port number; and determine the message type of the service message by performing matching between interface information included in the service message and the interface information sent by the first network element.

After receiving the interface information sent by the first network element, the communications unit 801 compares a timestamp of the received interface information with a timestamp of locally cached interface information, and if the timestamp of the interface information obtained from the first network element is later than the timestamp of the locally stored interface information, replaces the locally stored interface information with the newly obtained interface information. In addition, when the user delivers a configuration command to the first network element to add or change an external interface of the first network element, the first network element further sends a change notification message to the SLB in real time. The SLB updates information such as the local interface information and the distribution policy after receiving the change notification message.

Further, the processor 802 is configured to:

query the distribution identifier; and query the white list if the distribution identifier indicates that it is uncertain whether to forward the plurality of service messages received by the SLB to the first network element or the second network element, and forward the service message to the second network element if the user identifier in the service message is included in the white list, or forward the service message to the first network element if the user identifier in the service message is not included in the white list forward the service message to the second network element if the distribution identifier indicates that all of the plurality of service messages received by the SLB are to be forwarded to the second network element; or forward the service message to the first network element if the distribution identifier indicates that all of the plurality of service messages received by the SLB are to be forwarded to the first network element.

The distribution identifier may be a numerical symbol or a symbol in another form. This is not limited in this embodiment of the present invention. For example, a distribution identifier "0" may be used to indicate that it is uncertain whether to forward all of the plurality of service messages received by the SLB to the first network element or the second network element, a distribution identifier "1" may be used to indicate that all of the plurality of service messages received by the SLB are to be forwarded to the second network element, and a distribution identifier "2" may be used to indicate that all of the plurality of service messages received by the SLB are to be forwarded to the first network element.

Further, the processor 802 is configured to:

determine, according to the correspondence between a 5-tuple attribute of a logic link and a virtual local area network identifier VLAN ID that are in the distribution policy, a first virtual local area network identifier VLAN ID corresponding to the service message, where the first VLAN ID is used to identify a first virtual local area network, and the first virtual local area network includes the first network element or the second network element; and forward, according to a correspondence between a network element and a virtual local area network identifier VLAN ID of a virtual local area network in which the network element is located, the service message to a network element corresponding to the first VLAN ID.

The correspondence between a 5-tuple attribute of a logic link and a virtual local area network identifier VLAN ID is used to control a quantity of logic links for forwarding service messages to the second network element, and may be set according to a requirement. This is not limited in this embodiment of the present invention. In the network element upgrade process, when the user specifies a user whitelist on the EMS, the system calculates, according to a ratio of a quantity of whitelisted users to a total quantity of users on the system, a total quantity of logic links connecting the first network element and peripheral network elements into a quantity of logic links for distribution to the second network element of a new version, and changes a distribution policy for a corresponding quantity of logic links to distribution to the second network element. For example, if a user capacity of the first network element is 10000, there are four links connecting the first network element and peripheral network elements, and calls from 2500 users are expected to be distributed to the second network element of the new version, the SLB forwards a service message on one of the logic links to the second network element, and forwards service messages on the other three logic links still to the first network element.

Further, according to this embodiment of the present invention, to forward, to an external network element, a service message sent by a network element inside the system, and return, after a response message sent by the external network element is received, the response message to the internal network element by using a same path, the communications unit 801 is further configured to:

receive a first service message sent by the first network element or the second network element.

The processor 802 is further configured to: change a source port number in the first service message, and record, in a first relationship table, the changed source port number and a correspondence between the source port number and a virtual local area network identifier VLAN ID of a virtual local area network in which the network element sending the first service message is located; and forward the first service message including the changed source port number to the external network element.

The communications unit 801 is further configured to receive a response message returned by the external network element. The response message includes a destination port number, and the destination port number is the changed source port number.

The processor 802 is further configured to: query the first relationship table, to obtain a port number and a virtual local area network identifier VLAN ID that correspond to the destination port number; and send the response message to a port of a network element in a virtual local area network identified by the virtual local area network identifier VLAN ID.

The first service message is a non-IP link message and includes a source IP address, a source port number, a destination IP address, and a destination port number.

It should be noted that because two communications parties can be uniquely determined by using one logic link, for an IP link message, a response message can still be returned by using a same path and by using a method without port changing or port mapping. Therefore, in this embodiment of the present invention, the first service message is only a non-IP link message, and may include a SIP message and another message that is different from the SIP message and the IP link message.

For example, the first network element is located in a VLAN1, the second network element is located in a VLAN2, and the two network elements have a common port 1002. In this case, a message sent by the first network element and indicating that a source port number is 1002 may be changed to a message indicating that a port number is 31002, and a message sent by the second network element and indicating that a source port number is 1002 may be changed to a message indicating that a port number is 21002, and the foregoing information is recorded in Table 3. If a sent message indicating that a destination port number is 21002 is received by the SLB, it can be learned from Table 3 that the message is to be sent to the port 1002 of the second network element in the VLAN2; or if a sent message indicating that a destination port number is 31002 is received by the SLB, it can be learned from Table 3 that the message is to be sent to the port 1002 of the first network element in the VLAN1.

It can be learned from the foregoing that the SLB provided in this embodiment of the present invention receives the distribution policy delivered by the EMS; forwards, to the first network element according to the distribution policy, the some of the plurality of received service messages sent by the external network element, and forwards the remaining service messages to the second network element according to the distribution policy; and after the processing result of the service messages on the second network element meets the preset condition, forwards, to the second network element according to the distribution policy, all of the plurality of subsequently received service messages sent by the external network element. In this way, in a network element upgrade process, first, the SLB forwards some of service messages to the second network element for test running; then, after a running status on the second network element becomes normal, all of a plurality of subsequently received service messages are forwarded to the second network element. This reduces a risk that all services are damaged by switching all the services to a new network element in the network element upgrade process. In addition, an existing system architecture of a network element is not changed, only an SLB module is newly added outside the network element, and the internal structure of the network element is blocked. A network element instance is newly added inside the network element, and a message flow is controlled to be switched between new and old network elements, thereby preventing system reliability from decreasing during upgrade and meeting a telecommunication-level high reliability requirement.

Embodiment 6

Figure 9:
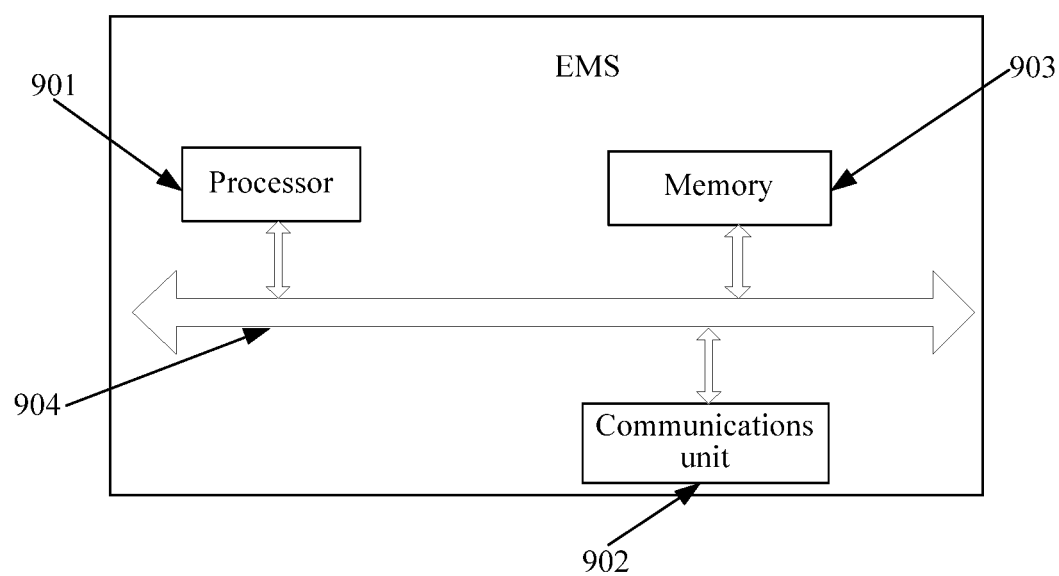
FIG. 9 is a structural diagram of an EMS according to an embodiment of the present invention.

FIG. 9 is a structural diagram of an element management system EMS 90 according to this embodiment of the present invention. As shown in FIG. 9, the EMS 90 may include a processor 901, a communications unit 902, a memory 903, and at least one communications bus 904 configured to implement connections and mutual communication between the apparatuses.

The communications unit 902 is configured to perform data transmission with an external network element.

The processor 901 may be a central processing unit (CPU for short).

The memory 903 may be a volatile memory, such as a random access memory (RAM for short); or a non-volatile memory, such as a read-only memory (ROM for short), a flash memory, a hard disk drive (HDD for short), or a solid-state drive (SSD for short); or a combination of the foregoing types of memories; and provide instructions and data to the processor 901.

The processor 901 is configured to create a second network element. The second network element has a same configuration attribute and connection configuration as a first network element. The second network element and the first network element are located in different virtual local area networks, and are isolated by using the VLANs, thereby avoiding an IP conflict. A version of the second network element is not lower than a version of the first network element. In addition, in a process of creating the second network element, the external network element does not perceive an overall change, and data of an interface between the external network element and the second network element does not need to be added to the external network element.

The communications unit 902 is configured to send a distribution policy to an SLB, so that the SLB forwards, to the first network element according to the distribution policy, some of a plurality of received service messages sent by an external network element, and forwards remaining service messages to the second network element according to the distribution policy; and after a processing result of the service messages on the second network element meets a preset condition, the SLB forwards, to the second network element according to the distribution policy, all of a plurality of subsequently received service messages sent by the external network element.

The distribution policy is developed by a manager according to a requirement and is sent by the EMS to the SLB. The distribution policy may be used to control a ratio of a quantity of service messages forwarded by the SLB to the first network element to a quantity of service messages forwarded by the SLB to the second network element, and the service messages are a plurality of service messages received by the SLB.

Further, the processor 901 is configured to:

instruct, by using a virtualized network function manager VNFM, a virtualized infrastructure manager VIM in which the first network element is located to create a virtual machine image file of the first network element;

instruct the VIM to create a virtual machine of the first network element; and embed the virtual machine image file of the first network element into the created virtual machine, to form the second network element.

Further, to improve resource utilization, in this embodiment of the present invention, the newly created second network element is a minimum function set of the first network element. When more service messages are gradually distributed to the second network element, the second network element implements automatic scale-out by using an auto scaling function. The first network element automatically implements scale-in because of a reduction in a quantity of services. In this way, a virtual machine released by means of scale-in of the first network element may be moved to the second network element for use, and infrastructure resource consumption can be reduced in this manner. A specific implementation is as follows:

The processor 901 is further configured to reduce a virtual machine resource of the first network element according to a quantity of reduced service messages that are processed on the first network element; and after the SLB forwards all of the plurality of received service messages to the second network element, delete the first network element to release virtual machine resources on the first network element.

It can be learned from the foregoing that the EMS provided in this embodiment of the present invention creates the second network element, where the second network element has the same configuration attribute and connection configuration as the first network element, the second network element and the first network element are located in the different virtual local area networks, and the version of the second network element is not lower than the version of the first network element; and sends the distribution policy to the SLB, so that the SLB forwards, to the first network element according to the distribution policy, the some of the plurality of received service messages sent by the external network element, and forwards the remaining service messages to the second network element according to the distribution policy; and after the processing result of the service messages on the second network element meets the preset condition, the SLB forwards, to the second network element according to the distribution policy, all of the plurality of subsequently received service messages sent by the external network element. In this way, in a network element upgrade process, first, the SLB forwards some of service messages to the second network element for test running; then, after a running status on the second network element becomes normal, all of a plurality of subsequently received service messages are forwarded to the second network element. This reduces a risk that all services are damaged by switching all the services to a new network element in the network element upgrade process.

In the several embodiments provided in this application, it should be understood that the disclosed system, device, and method may be implemented in other manners. For example, the described device embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate devices may or may not be physically separate, and devices displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the embodiments of the present invention. The foregoing storage medium includes: any medium that can store program code, such as a USB flash drive, a removable hard disk, a read-only memory (ROM for short), a random access memory (RAM for short), a magnetic disk, or an optical disc.

Persons of ordinary skill in the art may understand that all or some of the steps of the methods in the embodiments may be implemented by a program instructing relevant hardware. The program may be stored in a computer readable storage medium. The storage medium may include: a read-only memory, a random access memory, a magnetic disk, or an optical disc.

Finally, it should be noted that, the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. A network element upgrade method comprising:
  receiving, by a software load balancer (SLB), a distribution policy delivered by an element management system EMS;
  forwarding, by the SLB to a first network element according to the distribution policy, a part of a plurality of received service messages sent by an external network element, and forwarding remaining service messages to a second network element according to the distribution policy; and
  after a processing result of the remaining service messages on the second network element meets a preset condition, forwarding, by the SLB to the second network element according to the distribution policy, all of a plurality of subsequently received service messages sent by the external network element, wherein
  the distribution policy is used to control a ratio of a quantity of the service messages forwarded to the first network element to a quantity of the service messages forwarded to the second network element, the second network element has a same configuration attribute and connection configuration as the first network element, the first network element and the second network element are located in different virtual local area networks, and a version of the second network element is not lower than a version of the first network element.

2. The method according to claim 1, wherein a service message comprises a user identifier of a user triggering the service message; and forwarding the part of the plurality of received service messages, and forwarding the remaining service messages comprises:
  determining, by the SLB, a message type of each of the plurality of received service messages; and
  a) if the SLB determines that the message type of the service message is a session initiation protocol (SIP) message, forwarding the service message to the first network element or the second network element according to the user identifier comprised in the SIP message and a distribution identifier and a white list in the distribution policy, wherein the distribution identifier indicates that all of the plurality of service messages received by the SLB are to be forwarded to the first network element, all of the plurality of service messages received by the SLB are to be forwarded to the second network element, or the distribution identifier indicates that it is uncertain whether to forward the plurality of service messages received by the SLB to the first network element or the second network element, and the white list stores at least one user identifier; or
  b) if the SLB determines that the service message is an IP link message, forwarding the service message to the first network element or the second network element according to 5-tuple information comprised in the IP link message and a correspondence between a 5-tuple attribute of a logic link and a virtual local area network identifier (VLAN ID) that are in the distribution policy, wherein
  the 5-tuple information comprises an IP address of the external network element, a port number of the external network element, an IP address of the first network element, a port number of the first network element, and a transport protocol type; and the 5-tuple attribute of the logic link comprises a source IP address, a source port number, a destination IP address, a destination port number, and a transport protocol type.

3. The method according to claim 2, wherein forwarding the service message to the first network element or the second network element comprises:
  querying, by the SLB, the distribution identifier;
  querying the white list if the distribution identifier indicates that it is uncertain whether to forward the plurality of service messages received by the SLB to the first network element or the second network element, and forwarding the service message to the second network element if the user identifier in the service message is comprised in the white list, or forwarding the service message to the first network element if the user identifier in the service message is not comprised in the white list; and
  a) forwarding the service message to the second network element if the distribution identifier indicates that all of the plurality of service messages received by the SLB are to be forwarded to the second network element; or
  b) forwarding the service message to the first network element if the distribution identifier indicates that all of the plurality of service messages received by the SLB are to be forwarded to the first network element.

4. The method according to claim 2, wherein forwarding the service message to the first network element or the second network element comprises:
  determining, according to the correspondence between the 5-tuple attribute of the logic link and the VLAN ID that are in the distribution policy, a first VLAN ID associated with the service message, wherein the first VLAN ID is used to identify a first virtual local area network, and the first virtual local area network comprises the first network element or the second network element; and
  forwarding, according to a correspondence between a network element and a VLAN ID of a virtual local area network in which the network element is located, the service message to a network element associated with the first VLAN ID.

5. The method according to claim 2, wherein before receiving the distribution policy delivered by the EMS, the method further comprises:

sending, by the SLB, a synchronization request message to the first network element,
wherein the synchronization request message is used to request to obtain interface information of the first network element, and the interface information of the first network element comprises an IP address and a port number of a SIP server of the first network element and configuration information of a logic link for communication between the first network element and the external network element; and
receiving and storing, by the SLB, the interface information of the first network element, and setting an external interface attribute of the SLB according to the received interface information of the first network element, wherein the interface attribute comprises an IP address and a port number; and
wherein determining the message type of each of the plurality of received service messages comprises:
determining the message type of the service message according to interface information comprised in the service message and the interface information of the first network element.

6. The method according to claim 1, further comprising:
if the SLB receives a first service message sent by the first network element or the second network element, changing a source port number in the first service message, and recording, in a first relationship table, the changed source port number and a correspondence between the source port number and a virtual local area network identifier (VLAN ID) of a virtual local area network in which the network element sending the first service message is located;
forwarding the first service message comprising the changed source port number to the external network element;
receiving a response message returned by the external network element, wherein the response message comprises a destination port number, and the destination port number is the changed source port number;
querying the first relationship table, to obtain a port number and a VLAN ID that is associated with the destination port number; and
sending the response message to a port of a network element in the virtual local area network identified by the VLAN ID, wherein
the first service message is a non-IP link message and comprises a source IP address, a source port number, a destination IP address, and a destination port number.

7. The method according to claim 1, wherein the preset condition comprises one or more of the following cases:
(a) all service messages on the second network element are successfully processed; and
(b) a success rate of test cases of all service messages on the second network element is greater than or equal to a preset threshold.

8. A network element upgrade method applied to an element management system (EMS), the method comprising:
creating, by the EMS, a second network element, wherein the second network element has a same configuration attribute and connection configuration as a first network element, the first network element and the second network element are located in different virtual local area networks, and a version of the second network element is not lower than a version of the first network element; and
sending, by the EMS, a distribution policy to a software load balancer (SLB), wherein
the SLB forwards to the first network element according to the distribution policy a part of a plurality of received service messages sent by an external network element, and forwards remaining service messages to the second network element according to the distribution policy, and
wherein after a processing result of the service messages on the second network element meets a preset condition, the SLB forwards to the second network element according to the distribution policy all of a plurality of subsequently received service messages sent by the external network element.

9. The method according to claim 8, wherein creating the second network element comprises:
instructing, by the EMS using a virtualized network function manager (VNFM), a virtualized infrastructure manager (VIM) in which the first network element is located to create a virtual machine image file of the first network element;
instructing, by the EMS, the VIM to create a virtual machine of the first network element; and
embedding, by the EMS, the virtual machine image file of the first network element into the created virtual machine, to form the second network element.

10. The method according to claim 8, further comprising:
reducing, by the EMS, a virtual machine resource of the first network element according to a quantity of reduced service messages that are processed on the first network element; and
after the SLB forwards all of the plurality of subsequently received service messages to the second network element, deleting, by the EMS, the first network element to release the virtual machine resources on the first network element.

11. The method according to claim 8, wherein the preset condition comprises one or more of the following cases:
(a) all service messages on the second network element are successfully processed; and
(b) a success rate of test cases of all service messages on the second network element is greater than or equal to a preset threshold.

12. A software load balancer (SLB) comprising:
one or more processors; and
non-transitory computer-readable memory coupled to the one or more processors and storing a program to be executed by the one or more
processors, the program including:
instructions for receiving a distribution policy delivered by an element management system (EMS);
instructions for forwarding, to a first network element according to the distribution policy, a part of a plurality of received service messages sent by an external network element, and forward remaining service messages to a second network element according to the distribution policy; and
instructions for forwarding, to the second network element according to the distribution policy, all of a plurality of subsequently received service messages sent by the external network element, after a processing result of the remaining service messages on the second network element meets a preset condition, wherein
the distribution policy is used to control a ratio of a quantity of the service messages forwarded to the first network element to a quantity of the service messages forwarded to the second network element, the second network element has a same configuration attribute and connection configuration as the first network element, the first network element and the second network element are located in different virtual local area networks, and a version of the second network element is not lower than a version of the first network element.

13. The SLB according to claim 12, wherein a service message comprises a user identifier of a user triggering the service message; and the program further includes:
   instructions for determining a message type of each of the plurality of received service messages; and
   instructions for forwarding, if the message type of the service message is a session initiation protocol (SIP) message, the service message to the first network element or the second network element according to the user identifier comprised in the SIP message and a distribution identifier and a white list in the distribution policy, wherein the distribution identifier indicates that all of the plurality of service messages received by the SLB are to be forwarded to the first network element, all of the plurality of service messages received by the SLB are to be forwarded to the second network element, or the distribution identifier indicates that it is uncertain whether to forward the plurality of service messages received by the SLB to the first network element or the second network element, and the white list stores at least one user identifier; or
   instructions for forwarding, if the service message is an IP link message, the service message to the first network element or the second network element according to 5-tuple information comprised in the IP link message and a correspondence between a 5-tuple attribute of a logic link and a virtual local area network identifier (VLAN ID) that are in the distribution policy, wherein the 5-tuple information comprises an IP address of the external network element, a port number of the external network element, an IP address of the first network element, a port number of the first network element, and a transport protocol type; and the 5-tuple attribute of the logic link comprises a source IP address, a source port number, a destination IP address, a destination port number, and a transport protocol type.

14. The SLB according to claim 13, wherein the program further includes:
   instructions for querying the distribution identifier; and
   instructions for querying the white list if the distribution identifier indicates that it is uncertain whether to forward the plurality of service messages received by the SLB to the first network element or the second network element, and forward the service message to the second network element if the user identifier in the service message is comprised in the white list, or forward the service message to the first network element if the user identifier in the service message is not comprised in the white list;
   instructions for forwarding the service message to the second network element if the distribution identifier indicates that all of the plurality of service messages received by the SLB are to be forwarded to the second network element; or
   instructions for forwarding the service message to the first network element if the distribution identifier indicates that all of the plurality of service messages received by the SLB are to be forwarded to the first network element.

15. The SLB according to claim 13, wherein the program further includes:
   instructions for determining, according to the correspondence between the 5-tuple attribute of the logic link and the virtual local area network identifier (VLAN ID) that are in the distribution policy, a first VLAN ID associated with the service message, wherein the first VLAN ID is used to identify a first virtual local area network, and the first virtual local area network comprises the first network element or the second network element; and
   instructions for forwarding, according to a correspondence between a network element and a VLAN ID of a virtual local area network in which the network element is located, the service message to a network element associated with the first VLAN ID.

16. The SLB according to claim 12, wherein the preset condition is one or more of the following cases:
   (a) all service messages on the second network element are successfully processed; and
   (b) a success rate of test cases of all service messages on the second network element is greater than or equal to a preset threshold.

17. An element management system (EMS) comprising:
   one or more processors; and
   non-transitory computer-readable memory coupled to the one or more processors and storing a program to be executed by the one or more
   processors, the program including:
   instructions for creating a second network element, wherein the second network element has a same configuration attribute and connection configuration as a first network element, the first network element and the second network element are located in different virtual local area networks, and a version of the second network element is not lower than a version of the first network element; and
   instructions for sending a distribution policy to a software load balancer (SLB), so that the SLB forwards, to the first network element according to the distribution policy, a part of a plurality of received service messages sent by an external network element, and forwards remaining service messages to the second network element according to the distribution policy; and after a processing result of the service messages on the second network element meets a preset condition, the SLB forwards, to the second network element according to the distribution policy, all of a plurality of subsequently received service messages sent by the external network element.

18. The EMS according to claim 17, wherein the program further includes:
   instructions for instructing, by using a virtualized network function manager (VNFM), a virtualized infrastructure manager (VIM) in which the first network element is located to create a virtual machine image file of the first network element;
   instructions for instructing the VIM to create a virtual machine of the first network element; and
   instructions for embedding the virtual machine image file of the first network element into the created virtual machine, to form the second network element.

19. The EMS according to claim 17, wherein the program further includes:
   instructions for reducing a virtual machine resource of the first network element according to a quantity of reduced service messages that are processed on the first network element; and instructions for deleting, after the SLB forwards all of the plurality of subsequently received service messages to the second network element, the first network element to release the virtual machine resources on the first network element.

20. The EMS according to claim 17, wherein that the preset condition comprises one or more of the following cases:
(a) all service messages on the second network element are successfully processed; and
(b) a success rate of test cases of all service messages on the second network element is greater than or equal to a preset threshold.

* * * * *